(12) United States Patent
Jeong et al.

(10) Patent No.: US 11,884,127 B2
(45) Date of Patent: Jan. 30, 2024

(54) THERMAL MANAGEMENT SYSTEM FOR ELECTRIC VEHICLES

(71) Applicants: HYUNDAI MOTOR COMPANY, Seoul (KR); KIA CORPORATION, Seoul (KR)

(72) Inventors: Seong Bin Jeong, Hwaseong-si (KR); Wan Je Cho, Hwaseong-si (KR); Jae Eun Jeong, Hwaseong-si (KR); Hyun Jae Lee, Seongnam-si (KR); Nam Ho Park, Suwon-si (KR); Tae Hee Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/540,999

(22) Filed: Dec. 2, 2021

(65) Prior Publication Data

US 2022/0266651 A1 Aug. 25, 2022

(30) Foreign Application Priority Data

Feb. 25, 2021 (KR) .................. 10-2021-0025221

(51) Int. Cl.
*B60H 1/00* (2006.01)
*B60K 11/04* (2006.01)
(Continued)

(52) U.S. Cl.
CPC ..... *B60H 1/00278* (2013.01); *B60H 1/00885* (2013.01); *B60K 1/00* (2013.01); *B60K 11/04* (2013.01); *B60L 53/302* (2019.02); *B60L 58/26* (2019.02); *H01M 10/613* (2015.04); *H01M 10/625* (2015.04); *H01M 10/6556* (2015.04); *H01M 10/6568* (2015.04);
(Continued)

(58) Field of Classification Search
CPC ............ B60H 1/00278; B60H 1/00885; B60H 2001/00307; B60H 2001/00949; B60H 1/034; B60H 1/143; B60H 1/3228; B60H 2001/3291; B60H 1/32281; B60K 1/00; B60K 11/04; B60K 2001/005; B60K 2001/006; B60L 53/32; B60L 58/26
USPC ......................................................... 165/41
See application file for complete search history.

(56) References Cited

U.S. PATENT DOCUMENTS 10,384,512 B2 * 8/2019 Park .................... B60L 58/27
10,677,500 B2 * 6/2020 Kim ..................... F25B 25/005
(Continued)

*Primary Examiner* — Len Tran
*Assistant Examiner* — Gustavo A Hincapie Serna
(74) *Attorney, Agent, or Firm* — LEMPIA SUMMERFIELD KATZ LLC

(57) ABSTRACT

A thermal management system includes: a first radiator, a first electric water pump, and a first coolant line configured to allow a coolant to be circulated by the first electric water pump; a second radiator, a second electric water pump, and a second coolant line configured to allow a coolant to be circulated by the second electric water pump; and a first flow control device and a second flow control device installed at front ends and rear ends of the first radiator and the second radiator so as to control a coolant flow direction between the first coolant line, the second coolant line, and a third coolant line. The third coolant line is installed so as to connect the first flow control device and the second flow control device to each other.

17 Claims, 16 Drawing Sheets

(51) Int. Cl.
*B60K 1/00* (2006.01)
*B60L 53/302* (2019.01)
*B60L 58/26* (2019.01)
*H01M 10/613* (2014.01)
*H01M 10/625* (2014.01)
*H01M 10/6568* (2014.01)
*H01M 10/66* (2014.01)
*H01M 10/6556* (2014.01)

(52) U.S. Cl.
CPC ... *H01M 10/66* (2015.04); *B60H 2001/00307* (2013.01); *B60H 2001/00949* (2013.01); *B60K 2001/005* (2013.01); *B60K 2001/006* (2013.01); *B60L 2210/10* (2013.01); *H01M 2220/20* (2013.01)

(56) References Cited

U.S. PATENT DOCUMENTS

| | | | |
|---|---|---|---|
| 2014/0096550 A1* | 4/2014 | Gao | B60L 3/0046 62/126 |
| 2015/0101789 A1* | 4/2015 | Enomoto | B60H 1/039 236/35 |
| 2015/0217622 A1* | 8/2015 | Enomoto | F16K 11/076 62/244 |
| 2015/0273976 A1* | 10/2015 | Enomoto | B60L 3/0046 62/243 |
| 2016/0031288 A1* | 2/2016 | Nishikawa | B60H 1/00899 165/43 |
| 2016/0153343 A1* | 6/2016 | Kakehashi | B60H 1/3228 123/41.31 |
| 2016/0332505 A1* | 11/2016 | Yamanaka | B60L 1/003 |
| 2018/0086224 A1* | 3/2018 | King | H01M 10/66 |
| 2018/0208014 A1* | 7/2018 | Ben Ahmed | B60H 1/3211 |
| 2019/0152343 A1* | 5/2019 | Onozawa | F01P 7/14 |
| 2019/0366800 A1* | 12/2019 | Durrani | B60H 1/00485 |
| 2020/0189357 A1* | 6/2020 | Chopard | B60H 1/32281 |
| 2020/0198437 A1* | 6/2020 | Nagaoka | B60H 1/143 |
| 2020/0220236 A1* | 7/2020 | Durrani | H01M 10/667 |
| 2020/0361280 A1* | 11/2020 | Hashimoto | B60H 1/00428 |
| 2021/0300146 A1* | 9/2021 | Ishizeki | B60H 1/3205 |
| 2021/0370747 A1* | 12/2021 | Lee | F25B 25/005 |

* cited by examiner

THERMAL MANAGEMENT SYSTEM FOR ELECTRIC VEHICLES

CROSS-REFERENCE TO RELATED APPLICATION

This application claims, under 35 U.S.C. § 119(a), the benefit of priority to Korean Patent Application No. 10-2021-0025221 filed on Feb. 25, 2021, the entire contents of which are incorporated herein by reference.

BACKGROUND

(a) Technical Field

The present disclosure relates to a thermal management system for electric vehicles, and more particularly to a thermal management system for electric vehicles capable of greatly increasing the flow rate of a coolant in each coolant line and the flow rate of the coolant passing through each radiator and improving cooling performance under various vehicle conditions through coolant flow control.

(b) Background Art

In general, a vehicle is equipped with a heating, ventilation, and air conditioning (HVAC) system configured to heat or cool the interior of the vehicle. The air conditioning apparatus constantly maintains temperature in the interior of the vehicle at the optimum temperature, irrespective of a change in temperature of external air, thereby providing a comfortable interior environment.

An air conditioning apparatus for vehicles includes an air conditioning system configured to circulate a refrigerant. The air conditioning system mainly includes a compressor configured to compress a refrigerant, a condenser configured to condense the refrigerant compressed by the compressor, an expansion valve configured to expand the refrigerant liquefied as the result of being condensed by the condenser, and an evaporator configured to evaporate the refrigerant expanded by the expansion valve and to cool air blown to the interior of the vehicle using latent heat of evaporation of the refrigerant.

In the air conditioning system, the high-temperature, high-pressure gaseous refrigerant compressed by the compressor is condensed by the condenser and is circulated to the compressor via the expansion valve and the evaporator in a cooling mode in summer. At this time, the expansion valve expands the condensed liquid refrigerant so as to have low temperature and low pressure, and the evaporator cools air through heat exchange with the expanded refrigerant and discharges the cooled air to the interior of the vehicle, whereby interior cooling is achieved.

Meanwhile, with an increase in interest in energy efficiency and environmental contamination, environmentally friendly vehicles capable of substantially replacing internal-combustion engine vehicles have been developed in recent years. The environmentally friendly vehicles may be classified as electric vehicles using a fuel cell or a battery as a power source, such as a fuel cell electric vehicle (FCEV) and a battery electric vehicle (BEV). The environmentally friendly vehicles may further be classified as hybrid vehicles using an engine and a motor as a driving source, such as a hybrid electric vehicle (HEV) and a plug-in hybrid electric vehicle (PHEV). These environmentally friendly vehicles (xEV) have common ground in that these vehicles are motor-driven vehicles and electrified vehicles configured to be operated by driving the motor using power charged in the battery.

An electric vehicle is equipped with a thermal management system configured to perform thermal management of the vehicle. The thermal management system may be defined as a system in a broad sense including an air conditioning system of an air conditioning apparatus, a cooling system using a coolant or a refrigerant in order to perform thermal management and cooling of a power system, and a heat pump system.

Here, the cooling system includes components configured to circulate a coolant so as to cool or heat the power system in order to manage the temperature of the power system. The heat pump system, which is used as an auxiliary heating apparatus in addition to an electric heater (e.g., a positive temperature coefficient (PTC) heater), which is a main heating apparatus, is a system configured to collect waste heat of power electronic (PE) parts or a battery so as to be used for heating.

A conventional cooling system includes: a cooling circuit including a reservoir tank configured to store a coolant; an electric water pump configured to pump the coolant in order to circulate the coolant; a radiator and a cooling fan configured to dissipate heat from the coolant; a chiller configured to cool the coolant; a coolant heater configured to heat the coolant; an electric water pump configured to pump the coolant; valves configured to control flow of the coolant; a coolant line configured to connect the above components to each other; and a controller configured to control the temperature and flow of the coolant of the cooling circuit.

In a cooling system for electric vehicles, a coolant is circulated along a coolant path of power electronic (PE) parts configured to drive a vehicle and a coolant path of a battery configured to supply operating power to the power electronic parts in order to control temperatures of the power electronic parts and the battery. As needed, the cooling system may be configured to individually cool the power electronic parts and the battery or to collectively cool the power electronic parts and the battery. To this end, the cooling system may control operation of a three-way valve to control the flow direction of the coolant.

In recent years, a parallel type separation cooling system in which two radiators are disposed at the front end of an electric vehicle and parallel coolant lines connected to the radiators are provided so as to separately cool the power electronic parts and the battery in order to increase the range of the vehicle and to improve energy efficiency of the vehicle has been developed.

In the electric vehicle, thermal management of the vehicle and parts thereof is very important. Unless heat from the battery as well as a driving motor is appropriately removed, the parts cannot exhibit the optimum performance. Furthermore, an interior cooling and heating problem must be solved even in the electric vehicle, and air conditioning performance at the time of interior cooling and heating greatly affects energy efficiency of the vehicle.

In order to improve energy efficiency, technology for thermal management of the vehicle must be continuously developed. In a conventional thermal management system, a front wheel motor, a front wheel inverter, a rear wheel motor, a rear wheel inverter, a charger, and a converter are all disposed in series along a single coolant line, in which the power electronic parts are installed. As a result, flow resistance of the coolant that must sequentially pass through these parts is high.

Consequently, it is difficult to in increase flow rate of the coolant, when the flow rate of the coolant that passes through the radiator is reduced, and therefore cooling performance is deteriorated. Particularly, in a high-performance electric vehicle, it is difficult to increase flow rate of the coolant to handle an increase in the amount of heat radiation, whereby sufficient cooling performance is not satisfied. In addition, the flow rate of the coolant that passes through the water cooling type heat exchanger (water cooling type condenser) is also low, whereby sufficient condensation is not achieved. As a result, power consumption of the air conditioning system increases, and cooling performance thereof deteriorates.

The above information disclosed in this Background section is provided only to enhance understanding of the background of the disclosure. Therefore, the Background section may contain information that does not form the prior art that is already known in this country to a person of ordinary skill in the art.

SUMMARY OF THE DISCLOSURE

The present disclosure has been made in an effort to solve the above-described problems associated with the prior art.

It is an object of the present disclosure to provide a thermal management system for electric vehicles capable of greatly increasing flow rate of a coolant in each coolant line and flow rate of the coolant passing through each radiator and improving cooling performance under various conditions through coolant flow control.

The objects of the present disclosure are not limited to those described above. Other unmentioned objects of the present disclosure should be clearly understood by a person of ordinary skill in the art (hereinafter referred to as an "ordinary skilled person") from the following description.

In order to accomplish the objects, in an aspect, the present disclosure provides a thermal management system for electric vehicles. The thermal management system includes a water cooling type cooling system configured to cool power electronic parts and a battery. The water cooling type cooling system includes a first radiator, a first electric water pump, and a first coolant line connected to the first radiator. The first coolant line is configured to allow a coolant to be circulated by the first electric water pump. The water cooling type cooling system also includes a second radiator, a second electric water pump, and a second coolant line connected to the second radiator. The second coolant line is configured to allow a coolant to be circulated by the second electric water pump. The water cooling type cooling system also includes a first flow control device and a second flow control device installed at upstream ends and downstream ends of the first radiator and the second radiator so as to control a coolant flow direction between the first coolant line, the second coolant line, and a third coolant line. The third coolant line is installed so as to connect the first flow control device and the second flow control device to each other.

Other aspects and embodiments of the disclosure are discussed below.

BRIEF DESCRIPTION OF THE DRAWINGS

The above and other features of the present disclosure are described in detail with reference to certain embodiments thereof illustrated in the accompanying drawings, which are given hereinbelow by way of illustration only, and thus are not limitative of the present disclosure, and wherein.

Figure 1:
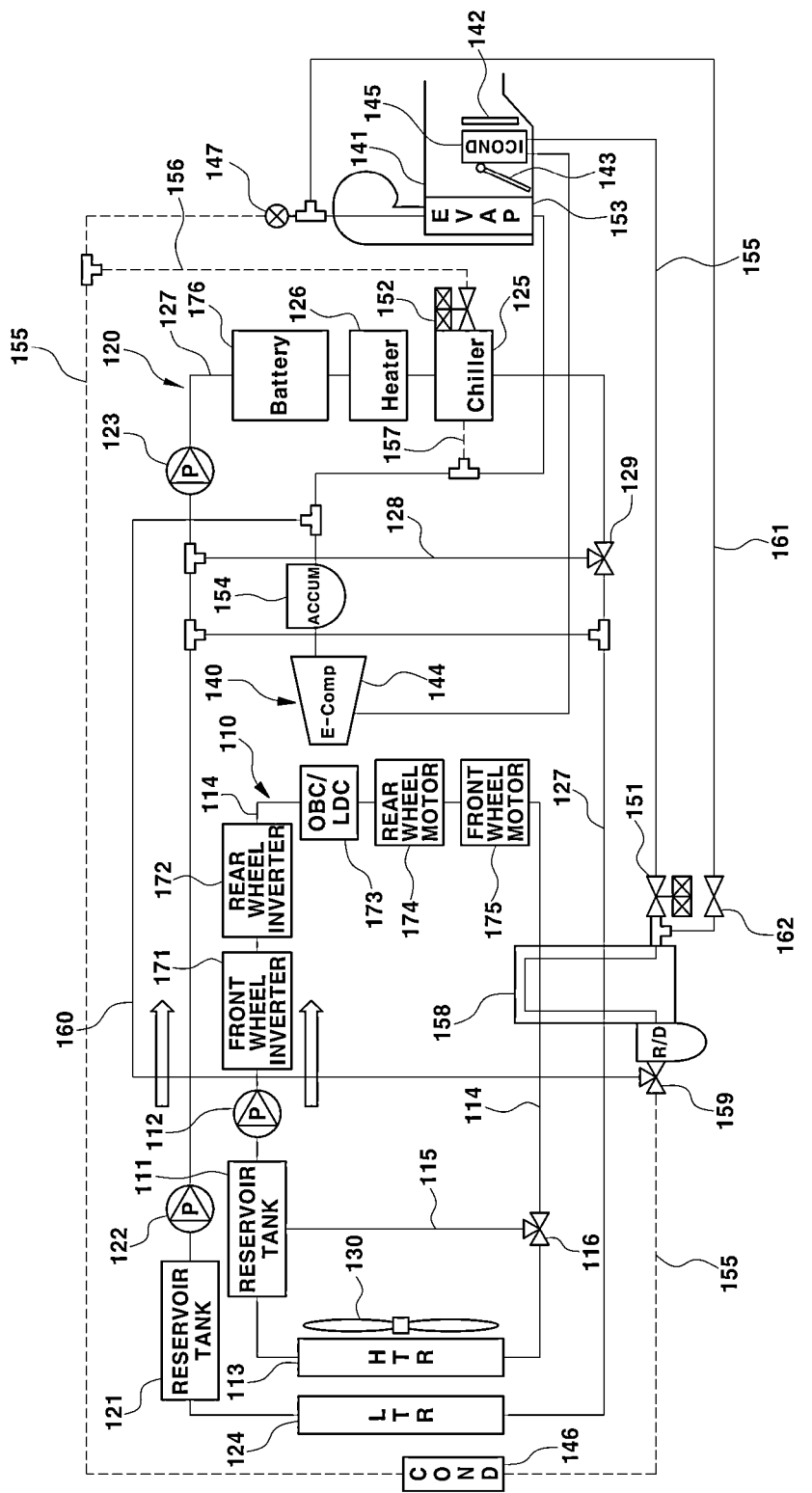
FIG. 1 is a view showing the construction of a thermal management system for electric vehicles according to a comparative example.

It should be understood that the appended drawings are not necessarily to scale and present a somewhat simplified representation of various features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Specific structural or functional descriptions of the embodiments of the present disclosure in this specification are given only to illustrate embodiments of the present disclosure. Embodiments of the present disclosure may be realized in various forms. In addition, the embodiments according to the concept of the present disclosure are not limited to such specific embodiments. It should be understood that the present disclosure includes all alterations, equivalents, and substitutes that fall within the idea and technical scope of the present disclosure.

It should be understood that, although the terms "first", "second", etc. may be used herein to describe various elements, corresponding elements should not be understood as being limited by these terms, which are used only to distinguish one element from another. For example, within the scope defined by the present disclosure, a first element may be referred to as a second element, and similarly, a second element may be referred to as a first element.

It should be understood that, when a component is referred to as being "connected to" or "coupled to" another component, it may be directly connected to or coupled to the other component, or intervening components may be present. In contrast, when a component is referred to as being "directly connected to" or "directly coupled to" another component, there are no intervening components present. Other terms that describe the relationship between components, such as "between" and "directly between" or "adjacent to" and "directly adjacent to", are to be interpreted in the same manner.

Wherever possible, the same reference numbers are used throughout the drawings to refer to the same or like parts. The terms used in this specification are provided only to explain specific embodiments but are not intended to restrict the present disclosure. A singular representation may include a plural representation unless it represents a definitely different meaning from the context. It should be further understood that the terms "comprises", "comprising" and the like, when used in this specification, specify the presence of stated components, steps, operations, and/or elements, but do not preclude the presence or addition of one or more other components, steps, operations, and/or elements.

When a component, device, element, or the like of the present disclosure is described as having a purpose or performing an operation, function, or the like, the component, device, or element should be considered herein as being "configured to" meet that purpose or to perform that operation or function.

First, the construction and problems of a thermal management system according to a comparative example are described to assist in understanding the present disclosure.

FIG. 1 is a view showing the construction of a thermal management system for electric vehicles according to a comparative example. Referring to FIG. 1, a cooling circuit includes parts configured to perform thermal management, coolant lines 114 and 127, in which a coolant flows, and a refrigerant line 155, in which a refrigerant flows.

As shown, the thermal management system for electric vehicles includes a water cooling type cooling system configured to perform thermal management and cooling of power electronic (PE) parts configured to drive a vehicle and includes a battery together with an air conditioning system 140. Here, the cooling system is configured to circulate a coolant so as to cool or heat the power electronic parts and the battery in order to manage the temperature of a power system. The cooling system may include parts configured to cool or heat the coolant.

The cooling system includes: cooling circuits 110 and 120 including reservoir tanks 111 and 121 configured to store a coolant; electric water pumps 112, 122, and 123 configured to pump the coolant in order to circulate the coolant; radiators 113 and 124 configured to radiate heat of the coolant; a chiller 125 configured to cool the coolant; a coolant heater 126 configured to heat the coolant; valves 116 and 129 configured to control flow of the coolant; coolant lines 114 and 127 configured to connect the above parts to each other; and a controller (not shown) configured to control the temperature and flow of the coolant in the cooling circuits 110 and 120.

Here, the controller controls the operation of the electric water pumps 112, 122, and 123, the coolant heater 126, an inner heater 142, a compressor 144, a cooling fan 130, an opening and closing door 143, a description of which follows, and also controls valves 116, 129, 147, 159, and 162 of the thermal management system. For example, the controller may control the operation of a third valve 116 and a fourth valve 129, each of which is a three-way valve, in order to control the flow direction of the coolant.

The cooling system allows the coolant to pass through a coolant path of power electronic parts 171-175 configured to drive the vehicle and a coolant path of a battery 176 configured to supply operating power to the power electronic parts, in order to control temperatures of the power electronic parts 171-175 and the battery 176. In addition, the cooling system may be configured to individually cool the power electronic parts 171-175 and the battery 176 or to collectively cool the power electronic parts and the battery, as needed.

In the thermal management system of FIG. 1, the cooling system is a parallel type separate cooling system in which two radiators 113 and 124 are disposed at the front end portion of the vehicle. Parallel type coolant lines 114 and 127 are configured so as to circulate the respective radiators in order to increase the range of the vehicle and to improve energy efficiency, whereby it is possible to separately cool the power electronic parts 171-175 and the battery 176.

Here, the power electronic parts to be cooled may include a front wheel motor 175 and a rear wheel motor 174, which are driving sources configured to drive the vehicle, a front wheel inverter 171 and a rear wheel inverter 172 configured to drive and control the front wheel motor 175 and the rear wheel motor 174, respectively, and an on-board charger (OBC) and low voltage DC-DC converter (LDC) 173 configured to charge the battery 176.

Referring to FIG. 1, it can be seen that the coolant lines 114 and 127 are individually connected to two radiators, i.e., a first radiator (HTR) 113 and a second radiator (LTR) 124. The first radiator 113 and the second radiator 124 radiate heat from the coolant circulated in the respective coolant lines 114 and 127 in order to cool the coolant through heat exchange between external air suctioned by the cooling fan 130 and the coolant in each radiator.

In the parallel type separate cooling system, depending on operating temperature (coolant temperature), the first radiator 113 is a high temperature radiator (HTR) that allows a relatively high-temperature coolant to pass therethrough in order to radiate heat of the coolant and to cool the coolant. The second radiator 124 is a low temperature radiator (LTR) that allows a relatively low-temperature coolant to pass therethrough in order to radiate heat of the coolant and to cool the coolant. The second radiator 124, which is a low temperature radiator, may be disposed in front of the first radiator 113, which is a high temperature radiator.

The first cooling line 114 connects the power electronic (PE) parts, such as the first radiator 113, the reservoir tank 111, the front wheel inverter 171, the rear wheel inverter 172, the on-board charger (OBC) and low voltage DC-DC converter (LDC) 173, the rear wheel motor 174, and the front wheel motor 175, to each other such that the coolant can be circulated.

In addition, a first electric water pump 112 configured to pump the coolant in order to circulate the coolant and a third valve 116 configured to allow the coolant to selectively flow to a first bypass line 115 that connects coolant lines at the front and the rear of the first radiator 113 to each other and to the first radiator 113 are installed in the first cooling line 114. Here, the third valve 116 may be a three-way valve capable of performing flow distribution.

As described above, a first cooling circuit 110 that circulates the coolant through the first coolant line 114 to cool the power electronic parts 171-175 is configured. In the first cooling circuit 110, the coolant pumped by the first electric water pump 112 sequentially passes through the power electronic parts, such as the front wheel inverter 171, the rear wheel inverter 172, the on-board charger (OBC) and low voltage DC-DC converter (LDC) 173, the rear wheel motor 174, and the front wheel motor 175, while being circulated along the first cooling line 114. While passing through the coolant paths of the power electronic parts 171-175, the coolant sequentially cools the power electronic parts, and the high-temperature coolant, after cooling the power electronic parts 171-175, is cooled through heat exchange with air and radiation of heat while passing through the first radiator 113.

Meanwhile, the second coolant line 127 is connected such that the coolant is circulated between the second radiator 124, the reservoir tank 121, the battery 176, the coolant heater 126, and the chiller 125. Here, the battery 176 supplies operating power to the power electronic parts, such as the front wheel motor 175 and the rear wheel motor 174. To this end, the battery 176 is connected to the power electronic parts 171-175 through electrical wiring, although electrical wiring is not shown in the figure. For example, the battery 176 is chargeably and dischargeably connected to the front wheel motor 175 and the rear wheel motor 174 via the front wheel inverter 171 and the rear wheel inverter 172, respectively. In addition, the battery 176 is connected to the on-board charger (OBC) and low voltage DC-DC converter (LDC) 173 through electrical wiring.

In addition, electric water pumps 122 and 123 configured to pump the coolant in order to circulate the coolant and a fourth valve 129 configured to allow the coolant to selectively flow to a second bypass line 128 that connects coolant lines at the front and the rear of the second radiator 124 to each other and to the second radiator 124 are installed on the second cooling line 127. Here, the fourth valve 129 may be a three-way valve capable of performing flow distribution. As described above, the second cooling circuit 120 that circulates the coolant through the second cooling line 127 to cool the battery 176 is configured. In the second cooling circuit 120, a plurality of electric water pumps, i.e., a second electric water pump 122 and a third electric water pump 123, may be installed on the second cooling line 127.

In the second cooling circuit 120, the coolant pumped by the electric water pumps 122 and 123 passes through a coolant path of the battery 176 while being circulated along the second cooling line 127, and the battery 176 is cooled by the coolant while the coolant passes through coolant path of the battery 176. In addition, the high-temperature coolant, after cooling the battery 176, is cooled through heat exchange with air and radiation of heat while passing through the second radiator 124.

The temperature of the coolant that has cooled the battery 176 is lower than the temperature of the coolant that has cooled the power electronic parts 171-175. Consequently, the second radiator 124 that radiates heat of the relatively low-temperature coolant may be a low temperature radiator (LTR), and the first radiator 113 that radiates heat of the relatively high-temperature coolant may be a high temperature radiator (HTR).

In FIG. 1, reference numeral 126 indicates the coolant heater, which may be installed in the second cooling line 127 between the battery 176 and the chiller 125. When it is necessary to increase temperature of the battery 176, the coolant heater 126 is turned on. The coolant heater heats the coolant circulated along the second cooling line 127 such that the heated coolant can be introduced into the coolant path in the battery 176. The coolant heater 126 may be an electric heater configured to be operated by power.

In addition, the thermal management system according to the comparative example may include an air conditioning system 140. The air conditioning system 140 mainly includes: a compressor 144 configured to compress a refrigerant; an external condenser (COND) 146 configured to condense the refrigerant compressed by the compressor 144 so as to be liquefied; a first expansion valve 147 configured to rapidly expand the refrigerant liquefied as the result of being condensed by the external condenser 146; and an evaporator (EVAP) 153 configured to evaporate the refrigerant expanded by the first expansion valve 147 and to cool air blown to the interior of the vehicle using latent heat of evaporation of the refrigerant.

Here, the external condenser (COND) 146 is disposed at the front end portion of the vehicle so as to allow external air to pass therethrough. In an air conditioning case 141, an internal condenser (ICOND) 145 is disposed at the rear of the evaporator (EVAP) 153. Consequently, air blown by an air conditioning blower (not shown) sequentially passes through the evaporator 153 and the internal condenser 145 and is then discharged to the interior of the vehicle. Reference numeral 142 indicates an internal heater (such as a positive temperature coefficient (PTC) heater), which is selectively operated. The internal heater 142 is configured to perform interior heating.

In a heating mode (heat pump mode), therefore, the internal heater 142 is operated such that air blown by the air conditioning blower is heated by the internal heater and is then discharged to the interior of the vehicle, whereby interior heating of the vehicle is performed. In a cooling mode (air conditioning mode), on the other hand, the compressor 144 is operated to circulate the refrigerant such that air blown by the air conditioning blower is cooled by the evaporator 153 (through heat exchange with the refrigerant) is then discharged to the interior of the vehicle, whereby interior cooling of the vehicle is performed.

In addition, an opening and closing door 143 is disposed between the evaporator 153 and the internal condenser 145 in the air conditioning case 141. The opening and closing door 143 selectively opens and closes a path that passes through the internal condenser 145. In the heating mode of the vehicle, the opening and closing door 143 is opened such that air that has passed through the evaporator 153 passes through the internal condenser 145 and the internal heater 142. In the cooling mode of the vehicle, the opening and closing door 143 closes the path to the internal condenser 145 and the internal heater 142 such that air cooled while passing through the evaporator 153 is directly discharged to the interior of the vehicle not via the internal condenser 145 and the internal heater 142.

In the air conditioning system 140, the refrigerant line 155 connects the compressor 144, the external condenser 146, the first expansion valve 147, and the evaporator 153 to each other such that the refrigerant is circulated. At the front end portion of the vehicle, the external condenser 146 may be disposed at front of the first radiator 113 and the second radiator 124. In addition, an accumulator 154 may be installed in the refrigerant line 155 between the compressor 144 and the evaporator 153.

In addition, the internal condenser 145 may be connected to the external condenser 146 via the refrigerant line 155, and the internal condenser 145 may be disposed on the refrigerant line 155 between the compressor 144 and the external condenser 146. The internal condenser 145 may be disposed at the rear of the evaporator 153 and in front of the internal heater 142 in the air conditioning case 141. Referring to FIG. 1, it can be seen that the internal condenser 145 is disposed between the evaporator 153 and the internal heater 142.

In the air conditioning system 140, therefore, the refrigerant is circulated through the compressor 144, the internal condenser 145, the external condenser 146, the first expansion valve 147, the evaporator 153, the accumulator 154, and the compressor 144. The compressor 144 is installed on the refrigerant line 155 between the internal condenser 145 and the evaporator 153 to compress a gaseous refrigerant so as to have high temperature and high pressure. The accumulator 154 is installed on the refrigerant line 155 between the compressor 144 and the evaporator 153 such that only the gaseous refrigerant is supplied to the compressor 144, whereby efficiency and durability of the compressor 144 are improved.

The external condenser 146 is connected to the internal condenser 145 via the refrigerant line 155, and receives the refrigerant compressed by the compressor 144 through the internal condenser 145 to condense the refrigerant through heat exchange with external air suctioned by the cooling fan 130. The first expansion valve 147 expands the refrigerant condensed by the external condenser 146, and the low-temperature, low-pressure refrigerant that has passed through the first expansion valve 147 is supplied to the evaporator 153. In the evaporator 153, heat exchange between the refrigerant expanded by the first expansion valve 147 and air blown by the air conditioning blower is performed, and air cooled through the heat exchange is discharged to the interior of the vehicle, whereby interior cooling is performed. The first expansion valve 147 may be a solenoid valve integrated expansion valve, a thermal expansion valve, or an electronic expansion valve.

Meanwhile, the thermal management system according to the comparative example includes a chiller 125 configured to cool the coolant circulated along the second coolant line 127 in order to cool the battery 176 through heat exchange with the refrigerant. The chiller 125 may be installed on the second coolant line 127 and the refrigerant line 155. More specifically, the chiller 125 may be installed on the second coolant line 127 for cooling the battery 176 and the refrigerant line 155 of the air conditioning system 140. Here, the refrigerant line 155, in which the chiller 125 is installed, may be separate branch refrigerant lines 156 and 157 diverging from the refrigerant line 155 of the air conditioning system 140.

Here, the branch refrigerant lines 156 and 157, in which the chiller 125 is installed, may be branch refrigerant lines that diverge from the refrigerant line 155 between the external condenser 146 and the first expansion valve 147 and are connected to the refrigerant line 155 between the evaporator 153 and the accumulator 154. A refrigerant inlet of the chiller 125 is connected to the refrigerant line 155 between the external condenser 146 and the first expansion valve 147 via the third expansion valve 152 and an inlet-side branch refrigerant line 156. In addition, a refrigerant outlet of the chiller 125 is connected to the refrigerant line 155 between the evaporator 153 and the accumulator 154 via an outlet-side branch refrigerant line 157.

In other words, the inlet-side branch refrigerant line 156 is a branch refrigerant line that diverges from the refrigerant line 155 between the external condenser 146 and the first expansion valve 147 and is connected to the refrigerant inlet of the chiller 125 via the third expansion valve 152. The outlet-side branch refrigerant line 157 is a branch refrigerant line that diverges from the refrigerant line 155 between the evaporator 153 and the accumulator 154 and is connected to the refrigerant outlet of the chiller 125.

The third expansion valve 152 may be installed on the refrigerant inlet of the chiller 125 or the inlet-side branch refrigerant line 156. In the cooling mode, the third expansion valve 152 expands the refrigerant that is introduced into the chiller 125 via the inlet-side branch refrigerant line 156 that diverges from the refrigerant line 155. Accordingly, the refrigerant introduced into the third expansion valve 152 via the inlet-side branch refrigerant line 156 may be introduced into the chiller 125 in a state in which the refrigerant is expanded and at the same time the temperature of the refrigerant is lowered. As a result, the refrigerant condensed by the external condenser 146 is introduced into the third expansion valve 152 from the refrigerant line 155 via the inlet-side branch refrigerant line 156, the low-temperature, low-pressure refrigerant expanded while passing through the third expansion valve 152 is introduced into the chiller 125, and the refrigerant passes through the chiller 125 and is then discharged to the refrigerant line 155 via the outlet-side branch refrigerant line 157.

As described above, the chiller 125 is installed on the second coolant line 127. Accordingly, the coolant circulated along the second coolant line 127 in order to cool the battery 176 passes through the chiller 125. As a result, heat exchange between the coolant passing through the chiller 125 and the low-temperature refrigerant may be performed. The coolant cooled as the result of heat exchange with the refrigerant in the chiller 125 may be circulated along the second coolant line 127, and the battery 176 may be cooled by the cooled coolant.

The thermal management system according to the comparative example may further include a water cooling type heat exchanger installed on the second coolant line 127 to perform heat exchange between the coolant and the refrigerant, i.e., a heat exchanger 158 installed between the two coolant lines 114 and 127 and the refrigerant line 155 to perform heat exchange between the coolant and the refrigerant, in addition to the chiller 125.

The installation position of the heat exchanger 158 on the first coolant line 114 connected to the first radiator 113 may be a position on the coolant line in which the coolant that has passed through the power electronic parts 171-175 flows to the first radiator 113, i.e., a position in the radiator front end coolant line connected from the power electronic parts 171-175 to an inlet of the first radiator 113. In addition, the installation position of the heat exchanger 158 on the second coolant line 127 connected to the second radiator 124 may be a position on the coolant line in which the coolant that has passed through the chiller 125 flows to the second radiator 124, i.e., a position in the radiator front end coolant line connected from the chiller 125 to an inlet of the second radiator 124.

In addition, the installation position of the heat exchanger 158 on the refrigerant line 155 may be a position on the refrigerant line between the internal condenser 145 and the external condenser 146. An inlet of the heat exchanger 158 is connected to the internal condenser 145 via the refrigerant line 155, and an outlet of the heat exchanger 158 is connected to the external condenser 146 via the refrigerant line 155.

In addition, a second expansion valve 151 may be installed on an inlet-side refrigerant line 155 connected to the inlet of the heat exchanger 158. In addition, a humidification line 161 may diverge from the inlet-side refrigerant line 155 and may be connected to the refrigerant line 155 between the first expansion valve 147 and the evaporator 153. The position at which the humidification line 161 diverges from the inlet-side refrigerant line 155 may be a position on the refrigerant line 155 between the inlet of the heat exchanger 158 and the second expansion valve 151. Accordingly, the humidification line 161 is a separate refrigerant line connected from the refrigerant line 155 between the inlet of the heat exchanger 158 and the second expansion valve 151 to the refrigerant line 155 between the first expansion valve 147 and the evaporator 153.

A second valve 159 may be installed at the outlet of the heat exchanger 158 or on the refrigerant line 155 connected from the outlet to the external condenser 146. The second valve 159 may be a three-way valve. In addition, a first valve 162 may be installed on the humidification line 161 diverging from the refrigerant line 155 at an inlet side of the heat exchanger 158. The first valve 162 may be a two-way valve configured to open and close the refrigerant line 155.

In addition, a separate connection line 160 connected to the refrigerant line 155 between the evaporator 153 and the accumulator 154 is connected to the second valve 159. In other words, the outlet of the heat exchanger 158, the connection line 160, and the refrigerant line 155 extending to the external condenser 146 are connected to the second valve 159 located at an outlet side of the heat exchanger 158.

The second valve 159 controls the flow direction of the refrigerant that has passed through the heat exchanger 158. The second valve 159 may control the flow direction of the refrigerant that has passed through the heat exchanger 158 such that the refrigerant flows to a selected one of the connection line 160 and the refrigerant line 155 extending to the external condenser 146. The connection line 160 may be a kind of bypass line configured to bypass the refrigerant that has passed through the heat exchanger 158 so as not to pass through the external condenser 146.

Also, in the thermal management system, the heat exchanger 158 serves as a water cooling type condenser in the cooling mode. In other words, the refrigerant is condensed by the coolant. In the cooling mode, heat exchange between the coolant and the refrigerant is performed while the coolant flowing along the two coolant lines 114 and 127 passes through the heat exchanger 158 and while the refrigerant that has passed through the internal condenser 145 passes through the heat exchanger 158 via the refrigerant line 155 and the second expansion valve 151. The heat exchange at this time is heat exchange performed such that heat is transferred from the refrigerant to the coolant and the refrigerant is further condensed (cooled) by the coolant.

In the heating mode, on the other hand, heat exchange between the coolant and the refrigerant is performed while the coolant flowing along the two coolant lines 114 and 127 passes through the heat exchanger 158 and while the refrigerant supplied through the refrigerant line 155 and the second expansion valve 151 after passing through the internal condenser 145 passes through the heat exchanger 158. The heat exchange at this time is heat exchange performed such that heat is transferred from the coolant to the refrigerant and the refrigerant is heated by the coolant.

In the heating mode, as described above, the heat exchanger 159 serves as a water cooling type waste heat collection chiller configured to transfer heat from the coolant to the refrigerant in order to collect waste heat through the coolant and the refrigerant. Also, in the heating mode, components configured to circulate the coolant and the refrigerant in the thermal management system are operated as a heat pump system. While the heat pump system is operated, waste heat of the power electronic parts 171-175 and the battery 176 is collected through the coolant and the refrigerant so as to be used to heat the interior of the vehicle through the internal condenser 145.

The heat pump system includes: the inner condenser 145 installed in the air conditioning case 141; the inner condenser being configured to allow the refrigerant compressed by the compressor 144 of the air conditioning system to pass therethrough; the heat exchanger 158, through which the coolant lines 114 and 127 of the cooling system and the coolant line 155 connected from the internal condenser 145 to the external condenser 146 extend; the heat exchanger being configured to perform heat exchange between the coolant and the refrigerant; and the second expansion valve 151 installed on the refrigerant line 155 between the internal condenser 145 to the heat exchanger 158.

As described above, the thermal management system for electric vehicles according to the comparative example has been described with reference to FIG. 1. The reason that the second radiator 124, which is a low temperature radiator (LTR) is separately separated from the thermal management system of FIG. 1 is that the temperature of the coolant that has passed through the second radiator 124 is less than 40° C. under the condition in which the temperature of external air is low and thus it is possible to cool the battery 176 using only the coolant. In this case, it is not necessary to operate the compressor, whereby it is possible to reduce power consumption and to improve energy efficiency of the vehicle under actual use conditions.

In the thermal management system of FIG. 1, however, the front wheel motor 175, the front wheel inverter 171, the rear wheel motor 174, the rear wheel inverter 172, and the on-board charger (OBC) and low voltage DC-DC converter (LDC) 173 are all disposed in series along the first coolant line 114, in which the power electronic parts are installed. As a result, flow resistance of the coolant that sequentially passes through these parts is high.

Consequently, it is difficult to increase flow rate of the coolant, and therefore the flow rate of the coolant that passes through the radiator HTR is low, whereby cooling performance is deteriorated. Particularly, in the case in which the thermal management system is applied to a high-performance electric vehicle, it is difficult to increase the flow rate of the coolant to handle an increase in the amount of heat radiation, whereby sufficient cooling performance is not satisfied. In addition, the flow rate of the coolant that passes through the water cooling type heat exchanger (water cooling type condenser) 158 is also low, whereby sufficient condensation is not achieved. As a result, power consumption of the air conditioner increases, and cooling performance thereof deteriorates.

Consequently, a thermal management system for electric vehicles capable of increasing the flow rate of a coolant in a coolant line and the flow rate of the coolant that passes through a radiator and achieving high cooling performance under various conditions by controlling flow of the coolant is disclosed.

Figure 2:
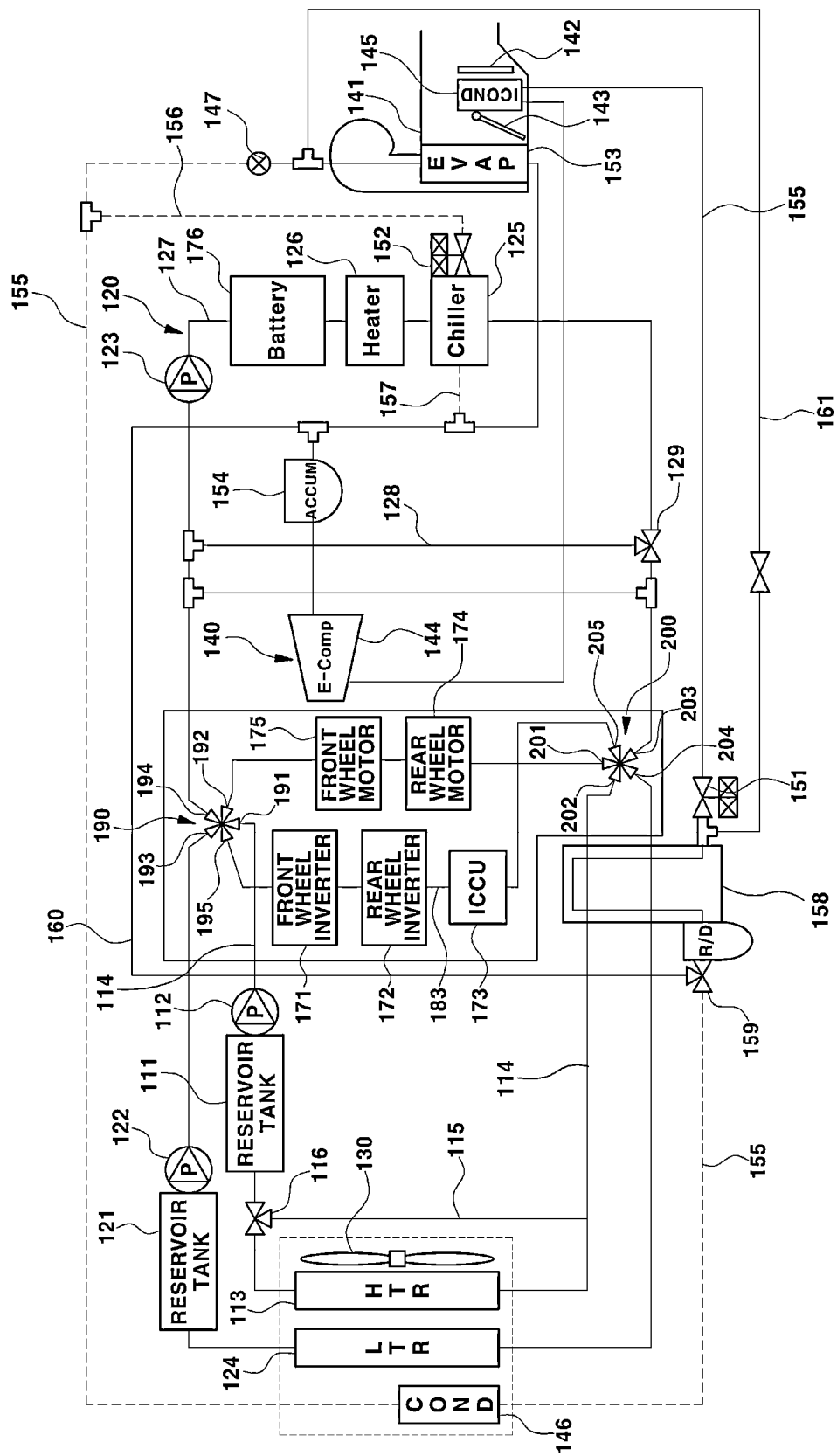
FIG. 2 is a view showing the construction of a thermal management system for electric vehicles according to a first embodiment of the present disclosure.

FIG. 2 is a view showing the construction of a thermal management system for electric vehicles according to a first embodiment of the present disclosure. In FIG. 2, reference numeral 173 indicates an integrated charging control unit (ICCU) in which an on-board charger (OBC) and a low voltage DC-DC converter (LDC) configured to charge a battery are integrated.

Hereinafter, the construction of the thermal management system according to the first embodiment shown in FIG. 2 is described. The construction different from that of the comparative example shown in FIG. 1 is described in full detail, and a description of the same construction as the comparative example shown in FIG. 1 is omitted. An ordinary skilled person should fully understand the portions of the construction of FIG. 2 that are identical to that of FIG. 1 from the description of the comparative example.

In the first embodiment shown in FIG. 2, the position of a third valve 116 is different from the position of the third valve 116 of the comparative example shown in FIG. 1. However, there is no difference between the embodiment and the comparative example in that the third valve 116 is a valve that is installed on a first bypass line 115 diverging from a first coolant line 114 so as to connect the front end and the rear end of a first radiator 113 to each other and that is configured to allow a refrigerant to selectively flow to the first radiator 113.

In the first embodiment shown in FIG. 2, the third valve 116 is installed at a branch point at which the first bypass line 115 diverges from the first coolant line 114 between a reservoir tank 111 and the first radiator 113. The third valve 116 may be a three-way valve capable of performing flow distribution. Functionally, there is no difference between the third valve 116 of FIG. 1 and the third valve 116 of FIG. 2.

As shown in FIG. 2, in the thermal management system according to the first embodiment, the first coolant line 114 connected to the first radiator 113, a second coolant line 127 connected to a second radiator 124, and a third coolant line 183, a description of which follows, are connected to each other via flow control valves 190 and 200, each of which is a flow control device. Here, flow control valves include two flow control valves configured to control flow of a coolant between the first coolant line 114, the second coolant line 127, and the third coolant line 183, i.e., a first flow control valve 190, which is a first flow control device, and a second flow control valve 200, which is a second flow control device.

The first coolant line 114 at the rear end of the first radiator 113 and the second coolant line 127 at the rear end of the second radiator 124 are connected to each other via the first flow control valve 190. In the same manner, the first coolant line 114 at the front end of the first radiator 113 and the second coolant line 127 at the front end of the second radiator 124 are connected to each other via the second flow control valve 200.

The front end and the rear end of the first radiator 113 indicate the positions of the first coolant line 114 based on the first radiator. The front end of the first radiator 113 in the first coolant line 114 means the upstream position of the first radiator in the first coolant line in a direction in which the coolant flows. Also, the rear end of the first radiator 113 on the first coolant line 114 means the downstream position of the first radiator on the first coolant line in the direction in which the coolant flows.

In the same manner, the front end and the rear end of the second radiator 124 indicate the positions of the second coolant line 127 based on the second radiator. The front end of the second radiator 124 on the second coolant line 127 means the upstream position of the second radiator on the second coolant line in the direction in which the coolant flows. Also, the rear end of the second radiator 124 on the second coolant line 127 means the downstream position of the second radiator on the second coolant line in the direction in which the coolant flows.

In the first embodiment of the present disclosure, as shown in FIG. 2, the second flow control valve 200 is disposed so as to connect the first coolant line 114 at the front end of a heat exchanger 158 and the second coolant line 127 at the front end of the heat exchanger to each other. Here, the front end of the heat exchanger 158 means the upstream position of the heat exchanger 158 on the first coolant line 114 and the second coolant line 127 in the direction in which the coolant flows.

In addition, an additional coolant line 183 diverging from the first coolant line 114 so as to be connected thereto in parallel is installed. The additional coolant line 183 is installed so as to connect the first flow control valve 190 and the second flow control valve 200 to each other. In the following description, the additional coolant line 183 is referred to as a third coolant line. Some power electronic (PE) parts of an electric vehicle are installed on the third coolant line 183.

In the first embodiment of the present disclosure, a five-way valve may be used as each of the first flow control valve 190 and the second flow control valve 200, and an electronic valve configured to be controlled according to a control signal of a controller (not shown) may be used as the five-way valve. Each of the first flow control valve 190 and the second flow control valve 200 is configured to control a total of five flow directions of the coolant, and has a total of five ports, through which the coolant is introduced and discharged.

Each of the first flow control valve 190 and the second flow control valve 200 may include a valve housing VH having five coolant introduction and discharge ports and a valve body VB, through which a flow passage VP that connects predetermined ones of the five ports to each other is formed. The valve body may be rotatably provided in the valve housing VH and the valve body may be configured to allow the predetermined ones of the five ports to selectively communicate with each other via the flow passage VP depending on the rotated position thereof. Each of the first control valve 190 and the second control valve 200 may also include an actuator (not shown) configured to rotate the valve body VB to a predetermined position according to a control signal of the controller (see FIGS. 11-13).

The construction of a multi-way valve controlled by the controller is known to an ordinary skilled person. In other words, the construction of such a known valve includes a valve housing VH having a plurality of ports and a valve body VB rotatably provided in the housing. The valve body may be configured to allow predetermined ones of the ports to selectively communicate with each other depending on the rotated position thereof. The construction of such a known valve may also include an actuator configured to rotate the valve body VB to a predetermined position under control of the controller, as in the construction of the five-way valve.

In the first embodiment of the present disclosure, the five-way valve may be adopted as each of the first flow control valve 190 and the second flow control valve 200 configured to change the flow direction of the coolant between the first coolant line 114, the second coolant line 127, and the third coolant line 183.

Each flow control valve is described in more detail. The first flow control valve 190, which is a five-way valve, has a first inlet port 191, a first outlet port 192, a second inlet port 193, a second outlet port 194, and a third outlet port 195. Here, the first coolant line 114 is connected to the first inlet port 191 and the first outlet port 192 of the first flow control valve 190. The first coolant line 114 connected to an outlet side of the first radiator 113 is connected to the first inlet port 191 of the first flow control valve 190. The first coolant line 114 connected to a first inlet port 201 of the second flow control valve 200 is connected to the first outlet port 192 of the first flow control valve 190.

Referring to FIG. 2, it can be seen that the first coolant line 114 connected to the outlet side of the first radiator 113 is connected to the first inlet port 191 of the first flow control valve 190 via the third valve 116, the reservoir tank 111, and a first electric water pump 112 in order.

In addition, the second coolant line 127 is connected to the second inlet port 193 and the second outlet port 194 of the first flow control valve 190. The second coolant line 127 connected to an outlet side of the second radiator 124 is connected to the second inlet port 193 of the first flow control valve 190. The second coolant line 127 connected to a coolant path inlet side of a battery 176 is connected to the second outlet port 194 of the first flow control valve 190. In addition, the third coolant line 183 is connected to the third outlet port 195 of the first flow control valve 190. The third coolant line 183 is connected to a third inlet port 205 of the second flow control valve 200.

Referring to FIG. 2, it can be seen that the second coolant line 127 connected to the outlet side of the outlet side of the second radiator 124 is connected to the second inlet port 193 of the first flow control valve 190 via a reservoir tank 121 and a second electric water pump 122 in order. In addition, it can be seen that the second coolant line 127 connected to the second outlet port 194 of the first flow control valve 190 is connected to the coolant path inlet side of the battery 176 via a third electric water pump 123.

The second flow control valve 200, which is a five-way valve, has a first inlet port 201, a first outlet port 202, a second inlet port 203, a second outlet port 204, and a third inlet port 205. Here, the first coolant line 114 is connected to the first inlet port 201 and the first outlet port 202 of the second flow control valve 200. The first coolant line 114 connected from the first outlet port 192 of the first flow control valve 190 is connected to the first inlet port 201 of the second flow control valve 200. The first coolant line 114 connected to an inlet side of the first radiator 113 is connected to the first outlet port 202 of the second flow control valve 200.

Referring to FIG. 2, it can be seen that the first coolant line 114 connected to the first outlet port 202 of the second flow control valve 200 is connected to the inlet side of the first radiator 113 via the water cooling type heat exchanger (water cooling type condenser) 158.

In addition, the second coolant line 127 is connected to the second inlet port 203 and the second outlet port 204 of the second flow control valve 200. The second coolant line 127 connected to a coolant path outlet side of the battery 176 is connected to the second inlet port 203 of the second flow control valve 200. The second coolant line 127 connected to an inlet side of the second radiator 124 is connected to the second outlet port 204 of the second flow control valve 200. In addition, the third coolant line 183 is connected to the third inlet port 205 of the second flow control valve 200, and the third coolant line 183 is connected from the third outlet port 195 of the first flow control valve 190.

Referring to FIG. 2, it can be seen that the second coolant line 127 connected to a coolant path outlet side of the battery 176 is connected to the second inlet port 203 of the second flow control valve 200 via a coolant heater 126 and a chiller 125 in order. In addition, it can be seen that the second coolant line 127 connected to the second outlet port 204 of the second flow control valve 200 is connected to the inlet side of the second radiator 124 via the water cooling type heat exchanger (water cooling type condenser) 158.

Meanwhile, the first coolant line 114 and the third coolant line 183 are connected to each other between the first flow control valve 190 and the second flow control valve 200. The first outlet port 192 of the first flow control valve 190 and the first inlet port 201 of the second flow control valve 200 are connected to each other via the first coolant line 114, and the third outlet port 195 of the first flow control valve 190 and the third inlet port 205 of the second flow control valve 200 are connected to each other via the third coolant line 183, which is a kind of branch line.

Some power electronic (PE) parts are installed on the first coolant line 114 between the first flow control valve 190 and the second flow control valve 200. A front wheel motor 175 and a rear wheel motor 174, which are some of the power electronic parts, are disposed on the first coolant line 114 between the two flow control valves 190 and 200 so as to be cooled by the coolant circulated through the first coolant line 114.

In the first embodiment of the present disclosure, the front wheel motor 175 and the rear wheel motor 174 may be disposed on the first coolant line 114 between the first flow control valve 190 and the second flow control valve 200 such that the front wheel motor 175 is located upstream and the rear wheel motor 174 is located downstream in a direction in which the coolant flows. In other words, the coolant circulated along the first coolant line 114 sequentially cools the front wheel motor 175 and the rear wheel motor 174 while sequentially passing through the front wheel motor 175 and the rear wheel motor 174.

In addition, inverters 171 and 172 and an integrated charging control unit (ICCU) 173, which are the other power electronic parts, are disposed on the third coolant line 183 between the first flow control valve 190 and the second flow control valve 200. Here, the inverters include a front wheel inverter 171 configured to drive and control the front wheel motor 175 and a rear wheel inverter 172 configured to drive and control the rear wheel motor 174.

In the first embodiment of the present disclosure, the front wheel inverter 171, the rear wheel inverter 172, and the integrated charging control unit (ICCU) 173 may be disposed on the third coolant line 183 between the first flow control valve 190 and the second flow control valve 200 such that the front wheel inverter 171 is located upstream, the rear wheel inverter 172 is located downstream of the front wheel inverter 171, and the integrated charging control unit (ICCU) 173 is located downstream of the rear wheel inverter 172 in the direction in which the coolant flows. In other words, the coolant distributed from the first coolant line 114 to the third coolant line 183 sequentially cools the front wheel inverter 171, the rear wheel inverter 172, and the integrated charging control unit (ICCU) 173 while sequentially passing through the front wheel inverter 171, the rear wheel inverter 172, and the integrated charging control unit (ICCU) 173

Among the power electronic (PE) parts, which are cooled and temperatures of which are maintained and managed by the thermal management system according to the first embodiment of the present disclosure, the front and rear wheel inverters 171 and 172 have smaller amounts of heat radiation than the front and rear wheel motors 175 and 174 and are maintained and managed at lower temperatures than the front and rear wheel motors 175 and 174. For example, on the assumption that the amount of heat radiation of each of the front and rear wheel inverters 171 and 172 is 0.3 kW and the amount of heat radiation of each of the front and rear wheel motors 175 and 174 is 0.6 kW, the management temperature of each of the front and rear wheel inverters 171 and 172 may be set to less than 65° C., and the management temperature of each of the front and rear wheel motors 175 and 174 may be set to less than 100° C. In addition, the amount of heat radiation of the battery 176 may be less than the amount of heat radiation of each motor and may be greater than the amount of heat radiation of each inverter. For example, on the assumption that the amount of heat radiation of the battery 176 is 3.0 kW, the management temperature of battery 176 may be set to less than 40° C.

The construction of the thermal management system according to the first embodiment of the present disclosure is described above in detail. Hereinafter, the operation state of the thermal management system according to the first embodiment of the present disclosure is described.

Figure 3:
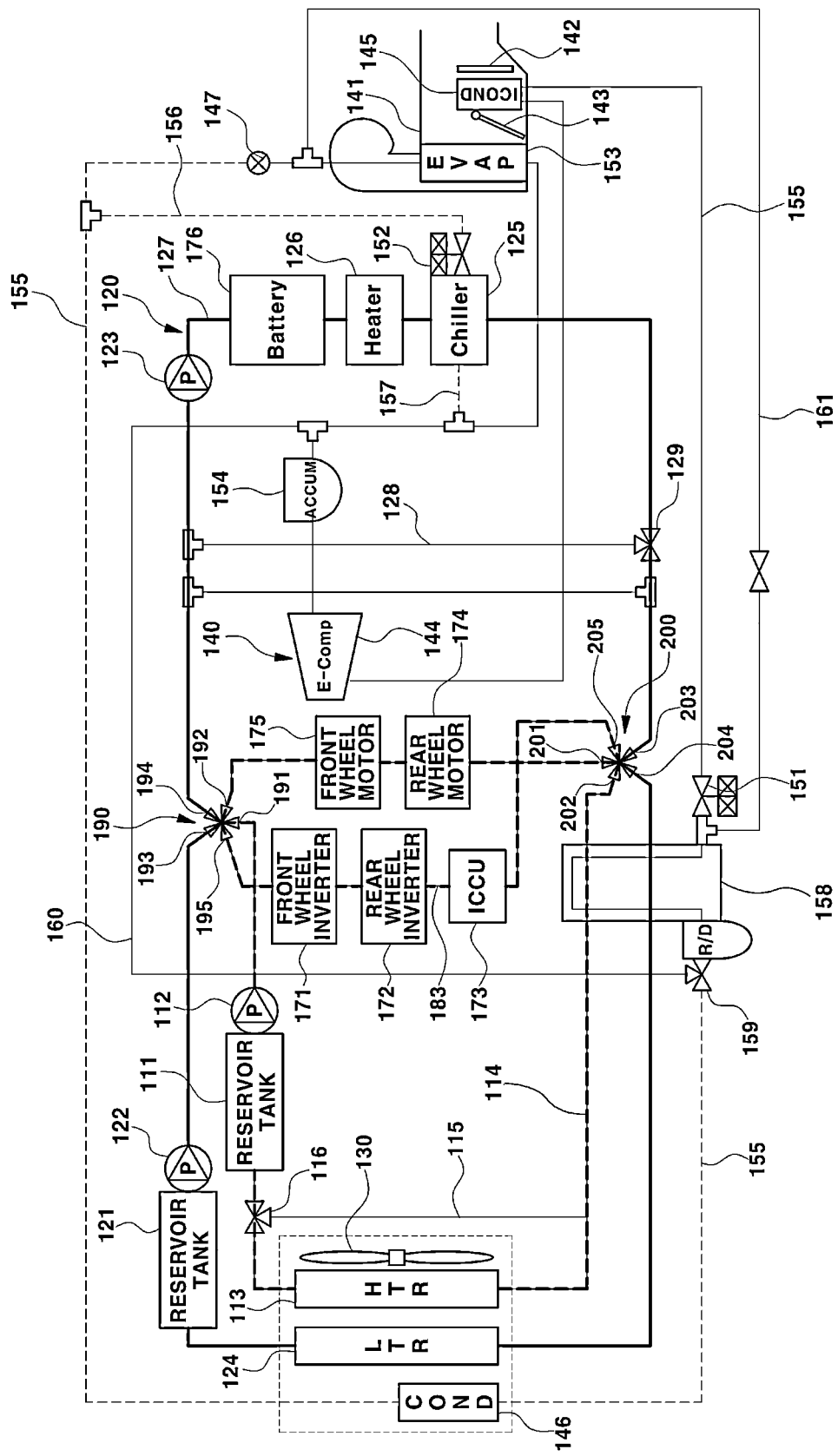
FIG. 3 is a view showing an operation state in a normal mode and a battery combination cooling mode in the present disclosure.

FIG. 3 is a view illustrating the operation state of the thermal management system according to the first embodiment of the present disclosure. FIG. 3 shows an operation state when a battery combination cooling mode is executed in the state in which a normal mode is selected from among vehicle driving modes by a driver. At the time of the normal mode and the battery combination cooling mode shown in FIG. 3, the first electric water pump 112 and the second electric water pump 122 are operated under control of the controller (not shown), whereby the coolant is circulated along the first coolant line 114, the second coolant line 127, and the third coolant line 183.

In addition, the operation state of each of the first flow control valve 190 and the second flow control valve 200 is controlled by the controller. The controller controls the actuator of each of the flow control valves 190 and 200 in order to control the rotational position of the valve body VB in the valve housing VH. At this time, an opening and closing state of the flow passage in each of the flow control valves 190 and 200 is controlled based on the rotational position of the valve body VB in the valve housing VH.

Figure 4:
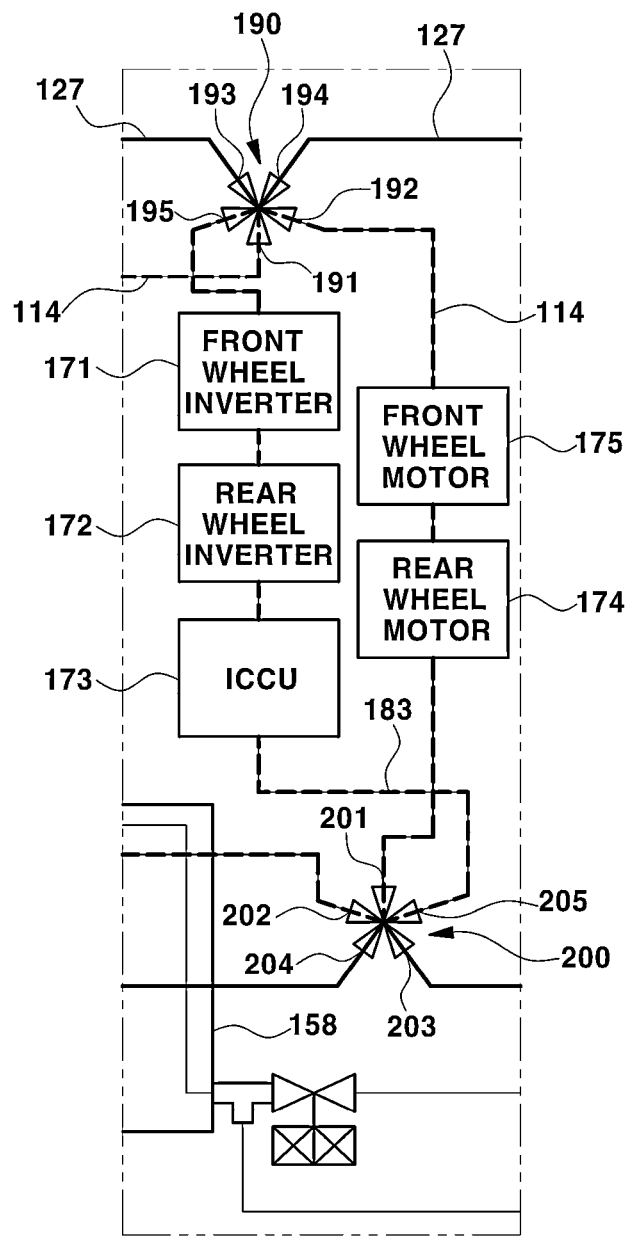
FIG. 4 is a view showing in detail a flow passage state and a coolant flow state of a flow control valve in the normal mode and the battery combination cooling mode in the present disclosure.

FIG. 4 is a view showing in detail a flow passage state of each of the first flow control valve 190 and the second flow control valve 200 in the normal mode and the battery combination cooling mode of FIG. 3.

Figure 11:
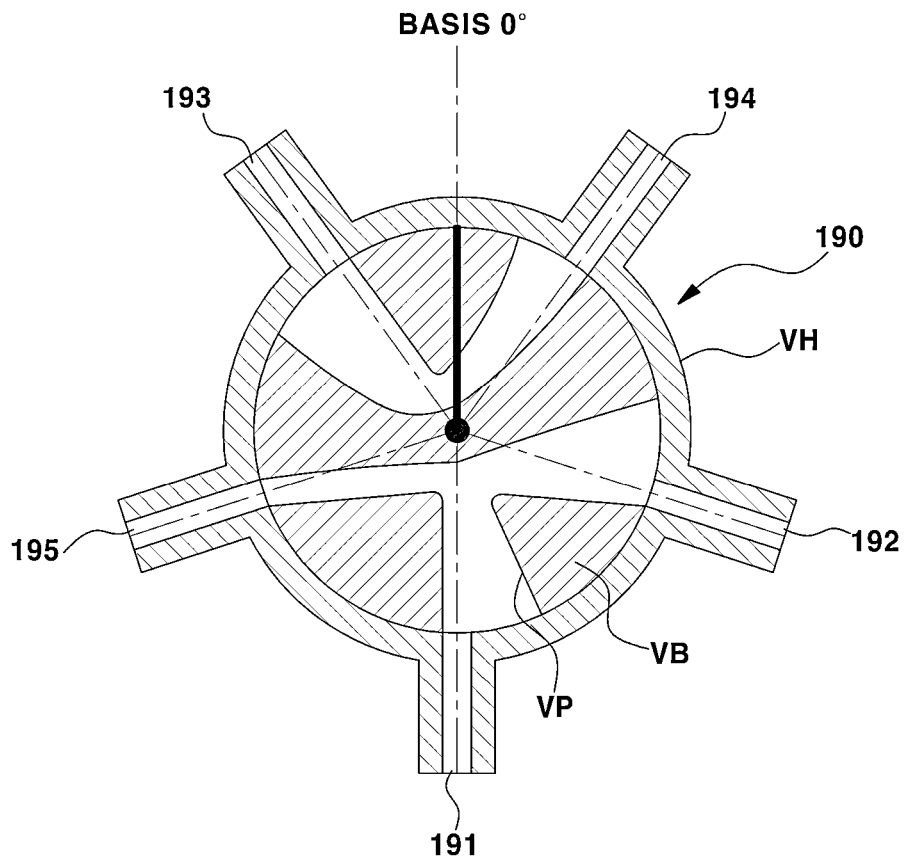
FIG. 11 is a view showing an opening state of the first flow control valve in the battery combination cooling mode in the present disclosure.

In the normal mode and the battery combination cooling mode of FIG. 3, the rotational position of the valve body VB (see FIG. 11) of the first flow control valve 190 is controlled such that the first inlet port 191, the first outlet port 192, and the third outlet port 195 communicate with each other via the flow passage VP (see FIG. 11) formed through the valve body VB, as can be seen from FIG. 4 (see FIG. 11). In addition, the rotational position of the valve body VB of the first flow control valve 190 is controlled such that the second inlet port 193 and the second outlet port 194 communicate with each other via the flow passage VP formed through the valve body VB.

In the valve body VB of the first flow control valve 190, however, the flow passage connecting the first inlet port 191, the first outlet port 192, and the third outlet port 195 to each other and the flow passage connecting the second inlet port 193 and the second outlet port 194 to each other are entirely divided from each other.

Also, in the normal mode and the battery combination cooling mode of FIG. 3, the rotational position of the valve body VB (see FIG. 13) of the second flow control valve 200 is controlled such that the first inlet port 201, the first outlet port 202, and the third outlet port 205 communicate with each other via the flow passage VP (see FIG. 13) formed through the valve body VB, as can be seen from FIG. 4. In addition, the rotational position of the valve body VB of the second flow control valve 200 is controlled such that the second inlet port 203 and the second outlet port 204 communicate with each other via the flow passage VP formed through the valve body VB.

In the valve body VB of the second flow control valve 200, however, the flow passage connecting the first inlet port 201, the first outlet port 202, and the third outlet port 205 to each other and the flow passage connecting the second inlet port 203 and the second outlet port 204 to each other are entirely divided from each other.

Figure 5:
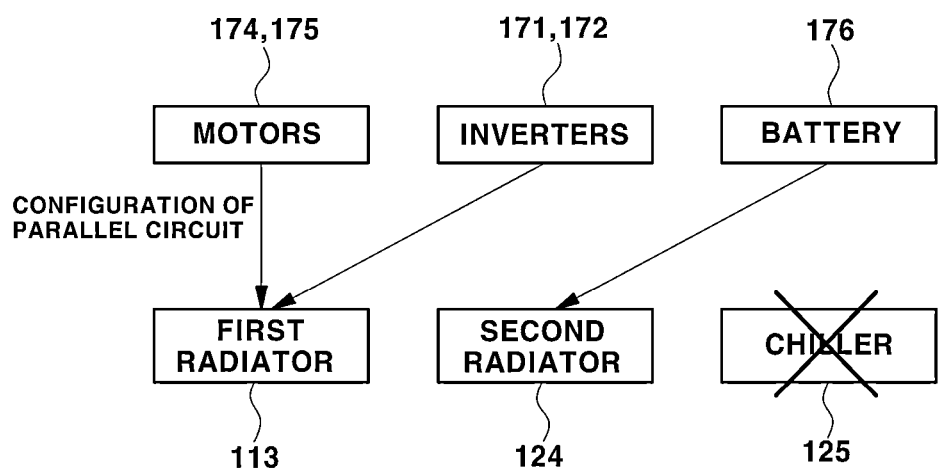
FIG. 5 is a view showing flow of a coolant from parts to radiators in the normal mode and the battery combination cooling mode in the present disclosure.

FIG. 5 is a view illustrating flow of the coolant from the front and rear wheel motors 175 and 174, the front and rear wheel inverters 171 and 172, and the battery 176 to the radiators in the normal mode and the battery combination cooling mode of FIG. 3. As shown, the chiller 125, which uses the refrigerant of the air conditioner, is not operated in the normal mode and the battery combination cooling mode, and the chiller is not used to cool the battery 176.

The power electronic (PE) parts and the battery 176 are cooled using only the coolant. The motors 174 and 175 and the inverters 171 and 172 installed on the first coolant line 114 and the third coolant line 183, which are parallel to each other, are cooled by the coolant cooled by the first radiator 113, which is a high temperature radiator HTR, as the result of heat radiation. In addition, the battery 176 installed on the second coolant line 124 is cooled by the coolant cooled by the second radiator 124, which is a low temperature radiator HTR, as the result of heat radiation.

More specifically, in the state in which the first flow control valve 190 and the second flow control valve 200 are controlled, the coolant circulated along the first coolant line 114 is cooled by the first radiator 113 as the result of heat radiation, and then flows to the first coolant line 114 connected from the first flow control valve 190 to the second flow control valve 200. At this time, the coolant cools the front wheel motor 175 and the rear wheel motor 174, and then flows to the second flow control valve 200. Meanwhile, the coolant distributed from the first flow control valve 190 to the third coolant line 183 cools the front wheel inverter 171, the rear wheel inverter 172, and the integrated charging control unit (ICCU) 173 while flowing along the third coolant line 183, and then flows to the second flow control valve 200.

At this time, the coolant that has moved to the second flow control valve 200 passes through the heat exchanger 158, moves to the first radiator 113, is cooled by the first radiator 113 as the result of heat radiation, and then flows to the first flow control valve 190 in order to cool the front wheel motor 175, the rear wheel motor 174, the front wheel inverter 171, the rear wheel inverter 172, and the integrated charging control unit 173. In this way, the coolant flowing along the first coolant line 114 and the third coolant line 183 cools the power electronic parts and is then continuously circulated along a route extending through the first radiator 113.

At the same time, the coolant circulated along the second coolant line 127 is cooled by the second radiator 124 as the result of heat radiation, and then moves to the second cooling circuit 120 via the second inlet port 193 and the second outlet port 194 of the first flow control valve 190. The coolant cools the battery 176 while flowing along the second coolant line 127 of the second cooling circuit.

The coolant that has cooled the battery 176 passes through the second inlet port 203 and the second outlet port 204 of the second flow control valve 200, passes through the heat exchanger 158 in the second coolant line 127, moves to the second radiator 124, is cooled by the second radiator 124 as the result of heat radiation, and flows to the first flow control valve 190 in order to cool the battery 176. In this way, the coolant in the second coolant line 127 is continuously circulated between the battery 176 and the second radiator 124 in order to cool the battery 176.

In the normal mode and the battery combination cooling mode of FIG. 3, as described above, the coolant flows in parallel along the first coolant line 114, the second coolant line 127, and the third coolant line 183, whereby line resistance may be greatly reduced, and therefore the flow rate of the coolant in the system may be increased.

In particular, the power electronic parts are cooled by the coolant flowing in parallel along the first coolant line 114 and the third coolant line 183 in the state in which some of the power electronic parts are divided from the remainder. In such a parallel structure, line resistance may be greatly reduced, compared to a series structure in which all of the power electronic parts are disposed in series along the first coolant line 114 so as to be cooled by the coolant flowing along the first coolant line, as in the comparative example of FIG. 1. Consequently, it is possible to greatly increase flow rate of the coolant under the same use condition of the electric water pump 112.

Also, in the battery combination cooling mode of FIG. 3, the battery 176 is cooled by only the coolant cooled by the second radiator 124 as the result of heat radiation while being circulated along the second coolant line 127. At this time, the chiller 125 is not operated. Consequently, the compressor 144 remains off, and therefore no refrigerant is circulated.

This combination cooling mode is usable under the condition in which the temperature of external air is low. Under the condition in which the temperature of external air is low, the temperature of the coolant discharged from the second radiator 124 may be maintained at less than 40° C., which is the temperature of the coolant required for the battery. Consequently, it is possible to cool the battery 176 using only the coolant without using the chiller 125. Since the battery 176 is cooled using only the coolant without operation of the compressor 144, it is possible to reduce power consumption and to improve energy efficiency of the vehicle.

Also, in the first embodiment of the present disclosure, the front wheel motor 175 and the rear wheel motor 174, operating temperatures of which are similar to each other, are disposed on the first coolant line 114. Also, the front wheel inverter 171 and the rear wheel inverter 172, operating temperatures of which are similar to each other, are disposed on the third coolant line 183. Whereby, temperature control is more easily performed than in the comparative example. In addition, since operating temperatures of the front and rear wheel motors 175 and 174 are higher, it is advantageous to send a larger amount of coolant to the first coolant line 114, in which the front and rear wheel motors 175 and 174 are installed, than to the third coolant line 183 between the two flow control valves 190 and 200. Such flow distribution is possible by changing the diameter of each coolant line. For example, in the case in which the diameter of the first coolant line 114 between the two flow control valves 190 and 200 is changed so as to be greater than the diameter of the third coolant line 183, it is possible to further increase flow rate of the coolant in the first coolant line and to further concentrate flow rate of the coolant on the motors.

Figure 6:
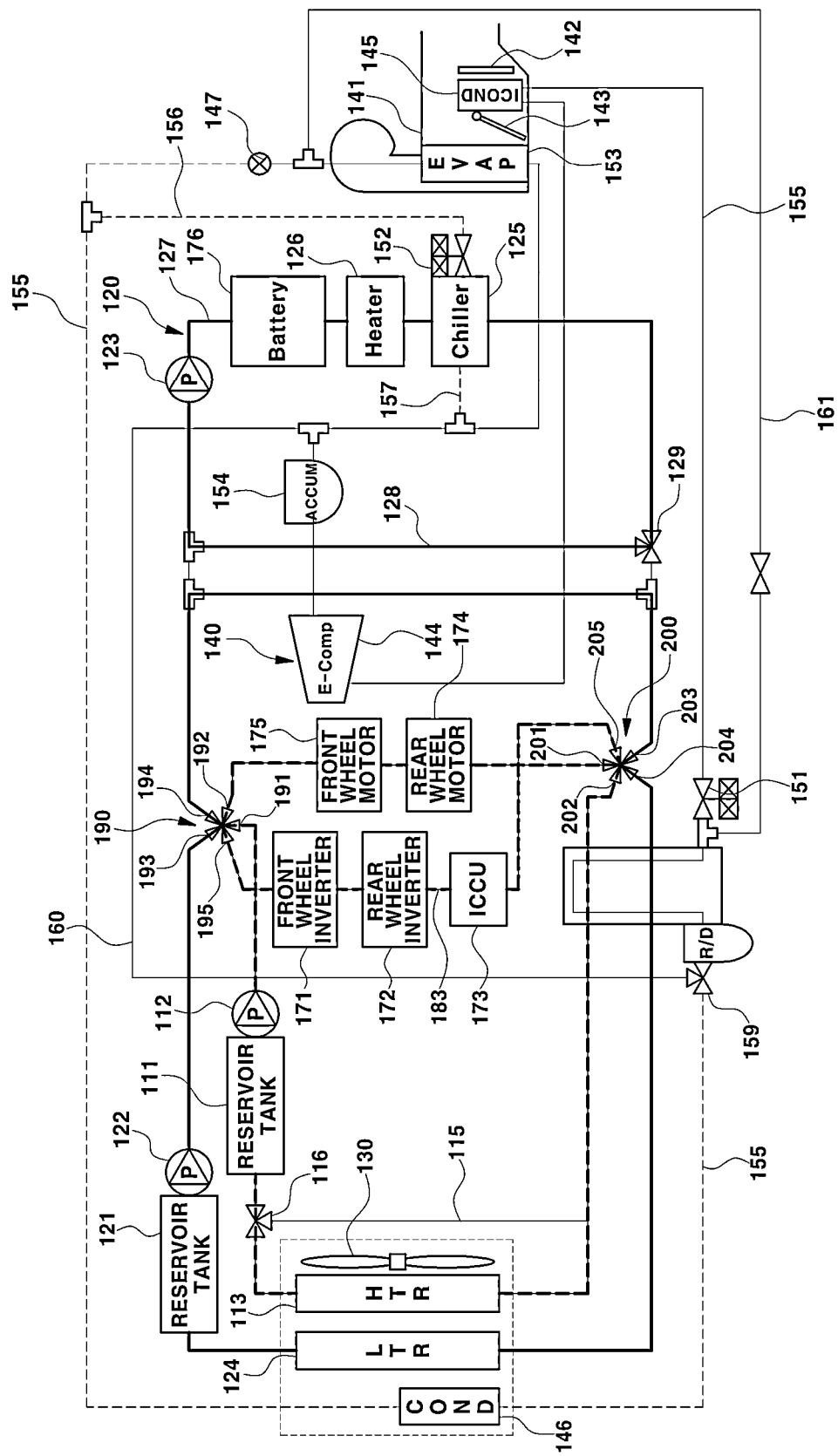
FIG. 6 is a view showing an operation state in the normal mode and a battery separation cooling mode in the present disclosure.
Figure 7:
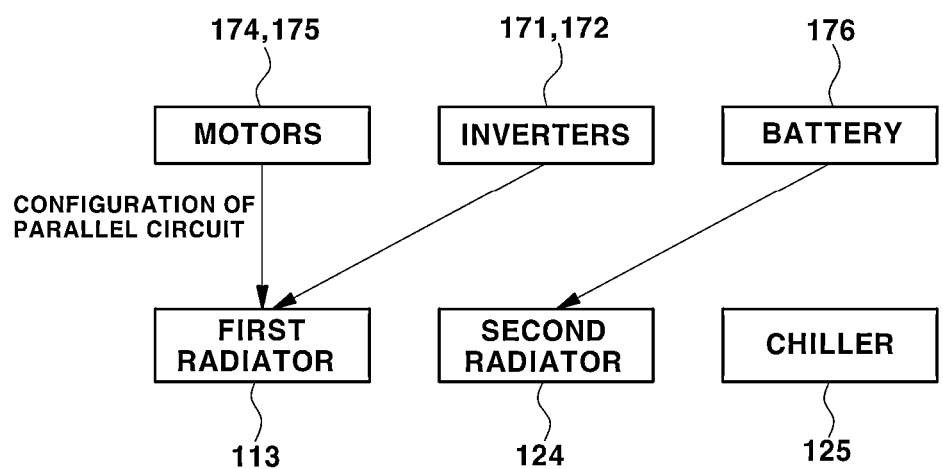
FIG. 7 is a view showing flow of the coolant from the parts to the radiators in the normal mode and the battery separation cooling mode and a battery cooling method in the present disclosure.

Next, FIG. 6 is a view illustrating another operation state of the thermal management system according to the first embodiment of the present disclosure. In addition, FIG. 7 is a view illustrating flow of the coolant from the front and rear wheel motors 175 and 174 and the front and rear wheel inverters 171 and 172 to the radiators and a method of cooling the battery 176 in the normal mode and the battery separation cooling mode of FIG. 6.

FIG. 6 shows an operation state in the normal mode and the battery separation cooling mode. In the normal mode and the battery separation cooling mode, the first electric water pump 112 and the second electric water pump 122 are operated under control of the controller (not shown), whereby the coolant is circulated along the first coolant line 114 and the second coolant line 127. In addition, the compressor 144 is operated under control of the controller, whereby the refrigerant is circulated along the refrigerant line.

In addition, the operation state of each of the first flow control valve 190 and the second flow control valve 200 is controlled by the controller. The controller controls the actuator of each of the flow control valves 190 and 200 to control the rotational position of the valve body VB in the valve housing VH. At this time, an opening and closing state of the flow passage in each of the flow control valves 190 and 200 is controlled based on the rotational position of the valve body VB in the valve housing VH.

In the normal mode and the battery separation cooling mode of FIG. 6, a flow passage state of each of the first flow control valve 190 and the second flow control valve 200 is not different from that in the normal mode and the battery combination cooling mode of FIG. 3. However, the battery 176 is not cooled by the coolant, and is cooled by the chiller 125, which uses the refrigerant of the air conditioner.

In other words, in the battery separation cooling mode of FIG. 6, the battery 176 is cooled using the chiller 125 instead of being cooled using the second radiator 124 and external air. To this end, the flow direction of the coolant is controlled through the fourth valve 129 such that the coolant flows only through the second bypass line 128 and such that the coolant does not pass through the second radiator 124.

Since the coolant is bypassed so as not to pass through the second radiator 124, as described above, separation cooling is performed in which the coolant is circulated through only the battery 176, the coolant heater 126, the chiller 125, the fourth valve 129, the second coolant line 127, in which the above components are disposed, and the second bypass line 128.

In the battery separation cooling mode, therefore, the coolant is cooled using the chiller 125 instead of the second radiator 124. In the chiller 125, the coolant must be cooled by the refrigerant while heat exchange between the refrigerant and the coolant is performed. Consequently, the compressor 144 is turned on to circulate the refrigerant along the refrigerant line 155. The battery separation cooling mode is usable under the condition in which the temperature of external air is high.

Referring to FIG. 2, it can be seen that the second bypass line 128 and the fourth valve 129 are installed downstream of the first flow control valve 190, which is a first flow control device, and upstream of the second flow control valve 200, which is a second flow control device, in the second coolant line 127. It can also be seen that the third electric water pump 123 is installed downstream of the position at which the second bypass line 128 diverges from the second coolant line 127.

In the normal mode and the battery separation cooling mode, cooling of the power electronic (PE) parts, such as the front and rear wheel inverters 171 and 172, the front and rear wheel motors 175 and 174, and the integrated charging control unit 173, is not different from that in the battery combination cooling mode of FIG. 3. Therefore, a description of cooling of the power electronic parts using the first coolant line 114, the third coolant line 183, and the first radiator 113 will be omitted.

Even in the normal mode and the battery separation cooling mode of FIG. 6, the coolant flows in parallel along the first coolant line 114 and the third coolant line 183, whereby line resistance may be greatly reduced. In addition, the coolant is separately circulated along the second coolant line 127 of the second cooling circuit 120 in order to cool the battery 176. Consequently, there is no difficulty in increasing the flow rate of the coolant in the system.

In the first embodiment of the present disclosure, the battery cooling mode in the normal mode may be switched from the combination mode to the separation mode depending on the temperature of external air or the temperature of the battery. Such mode switching may be performed by the controller controlling the operation of the electric water pump, the compressor 144, and the fourth valve 129. Also, in mode switching, switching from the combination mode, in which only the coolant is used, to the separation mode, in which the battery 176 is cooled using the chiller 125, is possible when stronger cooling of the battery 176 is necessary.

Figure 8:
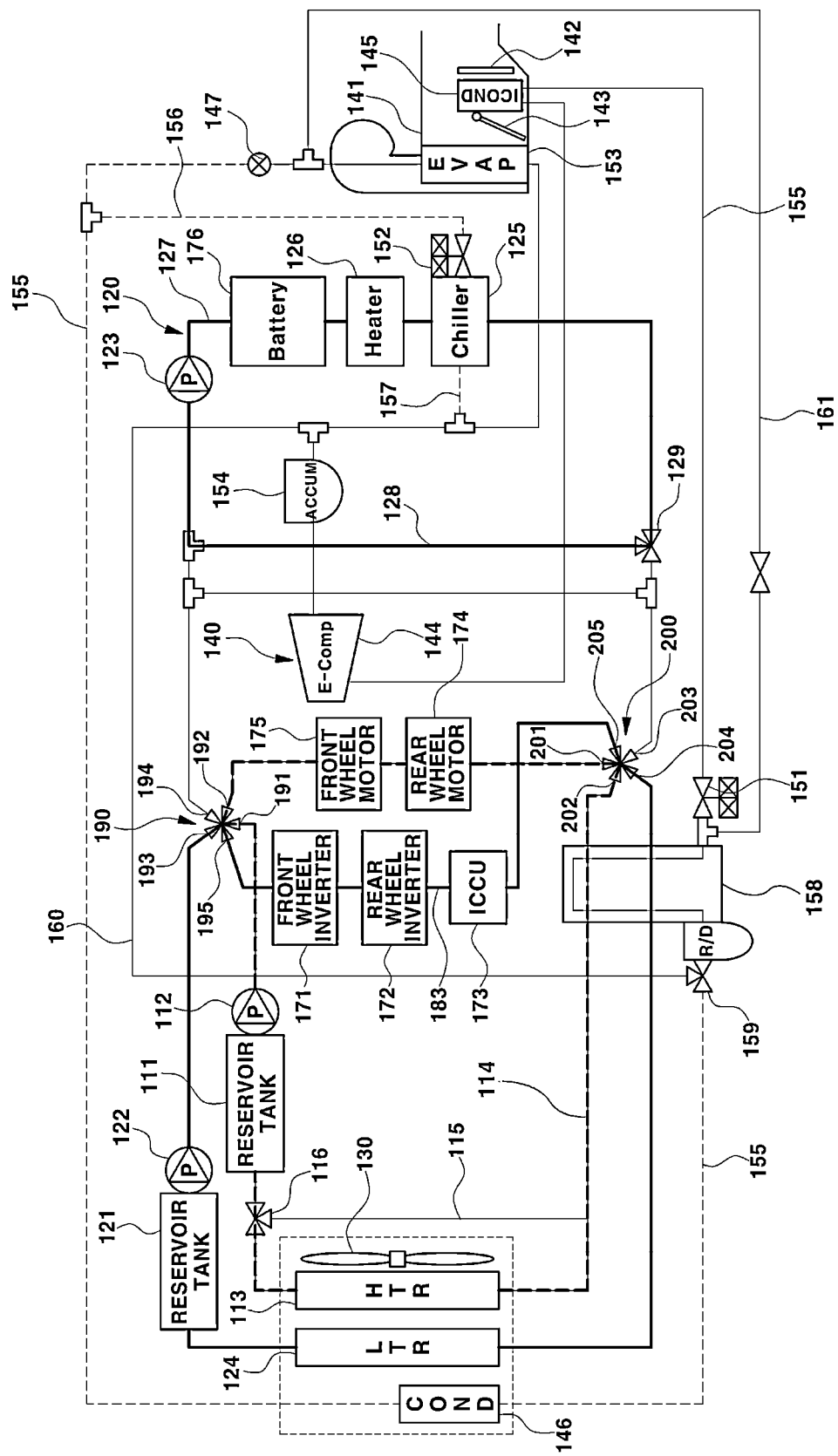
FIG. 8 is a view showing an operation state in a high performance mode in the present disclosure.

Next, FIG. 8 is a view showing another operation state of the thermal management system according to the first embodiment of the present disclosure. FIG. 8 shows an operation state in the case in which a high performance mode (i.e., a sports mode) is selected from among the vehicle driving modes by the driver. In the high performance mode, the first electric water pump 112 and the second electric water pump 122 are operated under control of the controller (not shown), whereby the coolant is circulated along the first coolant line 114 and the second coolant line 127. In addition, the compressor 144 is operated under control of the controller, whereby the refrigerant is circulated along the refrigerant line.

In addition, the operation state of each of the first flow control valve 190 and the second flow control valve 200 is controlled by the controller. The controller controls the actuator of each of the flow control valves 190 and 200 to control the rotational position of the valve body VB in the valve housing VH. At this time, an opening and closing state of the flow passage in each of the flow control valves 190 and 200 is controlled based on the rotational position of the valve body VB in the valve housing VH.

Figure 9:
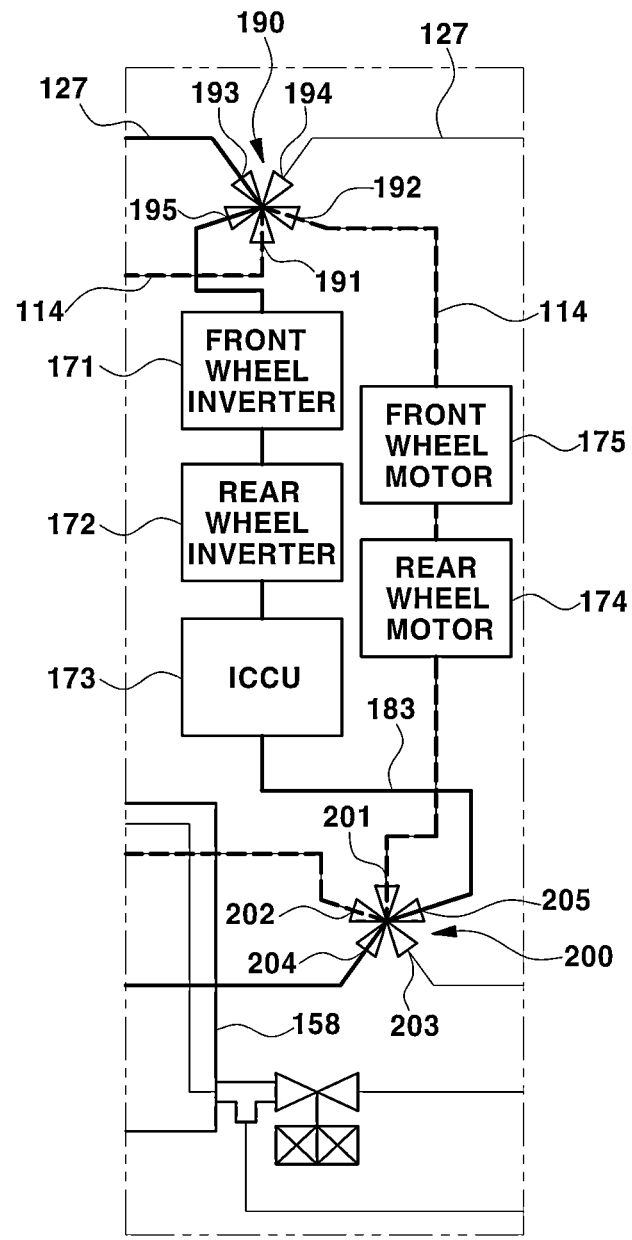
FIG. 9 is a view showing in detail flow passage states and coolant flow states of a first flow control valve and a second flow control valve in the high performance mode in the present disclosure.

FIG. 9 is a view showing in detail flow passage states of the first flow control valve 190 and the second flow control valve 200 in the high performance mode of FIG. 8.

In the high performance mode of FIG. 8, the rotational position of the valve body VB of the first flow control valve 190 is controlled such that the first inlet port 191 and the first outlet port 192 communicate with each other and the second inlet port 193 and the third outlet port 195 communicate with each other via the flow passage VP formed through the valve body VB, as can be seen from FIG. 9. At this position of the valve body VB, the second outlet port 194 of the first flow control valve 190 is closed by the valve body VB (see FIG. 12).

At this time, in the valve body VB of the first flow control valve 190, the flow passage connecting the first inlet port 191 and the first outlet port 192 to each other and the flow passage connecting the second inlet port 193 and the third outlet port 195 to each other are entirely divided from each other.

Also, in the high performance mode of FIG. 8, the rotational position of the valve body VB of the second flow control valve 200 is controlled such that the first inlet port 201 and the first outlet port 202 communicate with each other via the flow passage VP formed through the valve body VB, as can be seen from FIG. 9. In addition, the rotational position of the valve body VB of the second flow control valve 200 is controlled such that the third inlet port 205 and the second outlet port 204 communicate with each other via the flow passage VP formed through the valve body VB.

At this position of the valve body VB, the second inlet port 203 of the second flow control valve 200 may be in an open state, rather than closed by the valve body VB. However, the second outlet port 194 of the first flow control valve 190 is closed, whereby the coolant is not discharged through the second outlet port 194 of the first flow control valve 190. As a result, no coolant is introduced through the second inlet port 203 of the second flow control valve 200.

Even in the valve body VB of the second flow control valve 200, the flow passage connecting the first inlet port 201 and the first outlet port 202 to each other and the flow passage connecting the third inlet port 205 and the second outlet port 204 to each other are entirely divided from each other.

Figure 10:
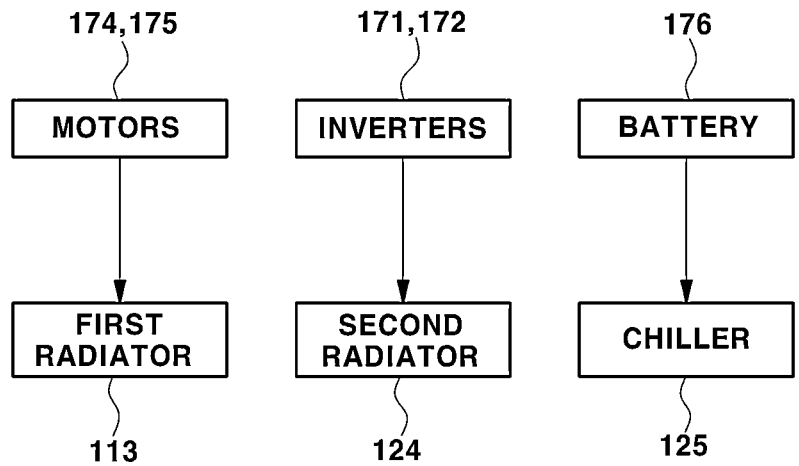
FIG. 10 is a view showing flow of the coolant from the parts to the radiators in the high performance mode and a battery cooling method in the present disclosure.

FIG. 10 is a view illustrating flow of the coolant from the front and rear wheel motors 175 and 174 and the front and rear wheel inverters 171 and 172 to the radiators 113 and 124 and a method of cooling the battery 176 in the high performance mode of FIG. 8. In the high performance mode, as shown in FIG. 8, the battery 176 is cooled using the chiller 125 instead of being cooled using the second radiator 124 and external air. To this end, flow direction of the coolant is controlled through the fourth valve 129 such that the coolant flows through the second bypass line 128 and such that the coolant does not pass through the second radiator 124. This is not different from the battery separation cooling shown in FIG. 6.

Since the coolant is bypassed so as not to pass through the second radiator 124, as described above, separation cooling is performed in which the coolant is circulated through only the battery 176, the coolant heater 126, the chiller 125, the fourth valve 129, the second coolant line 127, in which the above components are disposed, and the second bypass line 128.

In the high performance mode, therefore, the coolant is cooled using the chiller 125 instead of the second radiator 124. In the chiller 125, the coolant must be cooled by the refrigerant while heat exchange between the refrigerant and the coolant is performed. Consequently, the compressor 144 is turned on to circulate the refrigerant along the refrigerant line 155.

Also, in the high performance mode, the front and rear wheel motors 175 and 174 are cooled by the coolant cooled by the first radiator 113, which is a high temperature radiator HTR, as the result of heat radiation. Also, the front and rear wheel inverters 171 and 172 and the integrated charging control unit 173 are cooled by the coolant cooled by the second radiator 124, which is a low temperature radiator LTR, as the result of heat radiation.

In other words, in the state in which the first flow control valve 190 and the second flow control valve 200 are controlled, as described above, the coolant circulated along the first coolant line 114 is cooled by the first radiator 113 as the result of heat radiation. The coolant is then distributed and flows to the first coolant line 114 connected from the first flow control valve 190 to the second flow control valve 200. At this time, the coolant cools the front wheel motor 175 and the rear wheel motor 174 while flowing along the first coolant line 114, and then flows to the second flow control valve 200.

The coolant that has moved to the second flow control valve 200 passes through the heat exchanger 158, moves to the first radiator 113, is cooled by the first radiator 113 as the result of heat radiation, and then flows to the first flow control valve 190 in order to cool the front wheel motor 175 and the rear wheel motor 174. In this way, the coolant flowing along the first coolant line 114 cools the front wheel motor 175 and the rear wheel motor 174 and is then continuously circulated along a route extending through the first radiator 113.

At the same time, the coolant circulated along the second coolant line 127 is cooled by the second radiator 124 as the result of heat radiation, and then moves to the third coolant line 183 connected to the second flow control valve 200 via the second inlet port 193 and the third outlet port 195 of the first flow control valve 190. The coolant cools the front wheel inverter 171, the rear wheel inverter 172, and the integrated charging control unit 173 while flowing along the third coolant line 183.

The coolant that has cooled the front wheel inverter 171, the rear wheel inverter 172, and the integrated charging control unit 173 passes through the third inlet port 205 and the second outlet port 204 of the second flow control valve 200. The coolant then passes through the heat exchanger 158 in the second coolant line 127, moves to the second radiator 124, is cooled by the second radiator 124 as the result of heat radiation, and flows to the first flow control valve 190 in order to cool the front wheel inverter 171, the rear wheel inverter 172, and the integrated charging control unit 173.

In this way, the coolant passing through the second radiator 124 is continuously circulated along the second coolant line 127 and the third coolant line 183 between the first flow control valve 190 and the second flow control valve 200 in order to cool the front wheel inverter 171, the rear wheel inverter 172, and the integrated charging control unit 173.

Even in the high performance mode of FIG. 8, as described above, the coolant flows along the first coolant line 114, the second coolant line 127, and the third coolant line 183 by the electric water pumps 112 and 122, whereby line resistance may be greatly reduced. In addition, the coolant is separately circulated along the second coolant line 127 of the second cooling circuit 120 in order to cool the battery 176. Consequently, there is no difficulty in increasing flow rate of the coolant in the system.

In particular, the coolant flows in parallel along the first coolant line 114 and the second coolant line 127, whereby line resistance may be greatly reduced, and therefore flow rate of the coolant in the system may be increased.

In the case in which the driver selects the high performance mode (sports mode), as described above, thermal management control to cool the power electronic (PE) parts and the battery in the operation states of FIGS. 8-10 is performed, whereby stronger specialized cooling performance may be exhibited. In the high performance mode, the front wheel inverter 171, the rear wheel inverter 172, and the integrated charging control unit (ICCU) 173 are separately cooled using the second radiator 124, whereby greater cooling performance may be exhibited.

Figure 12:
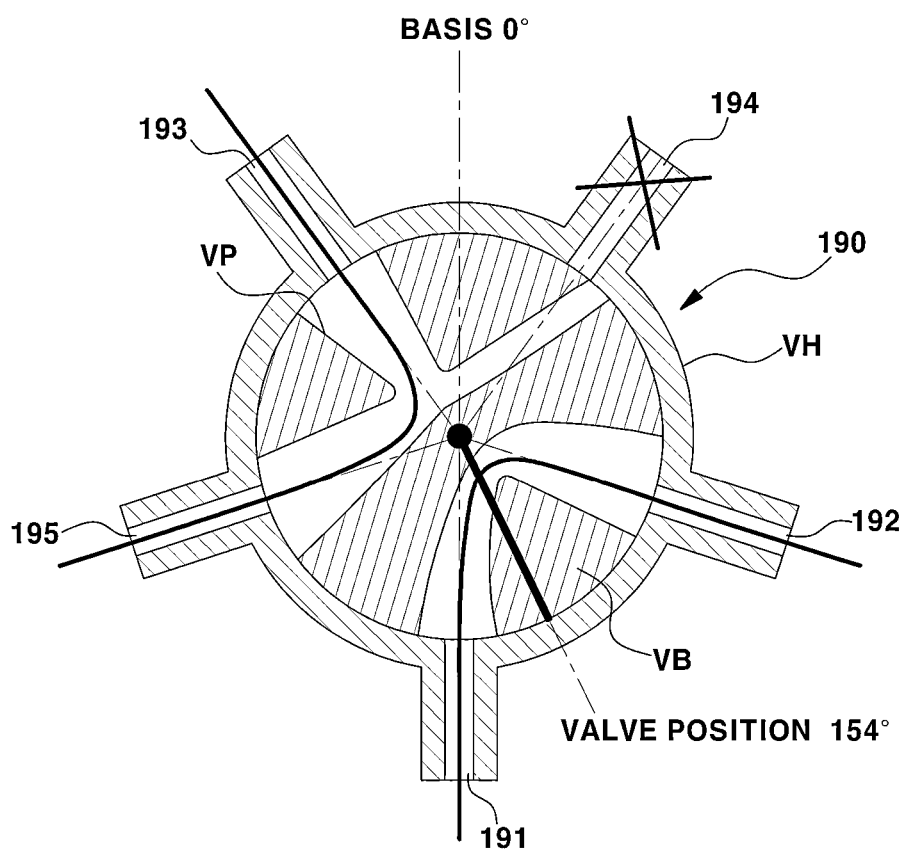
FIG. 12 is a view showing the opening state of the first flow control valve in the high performance mode.
Figure 13:
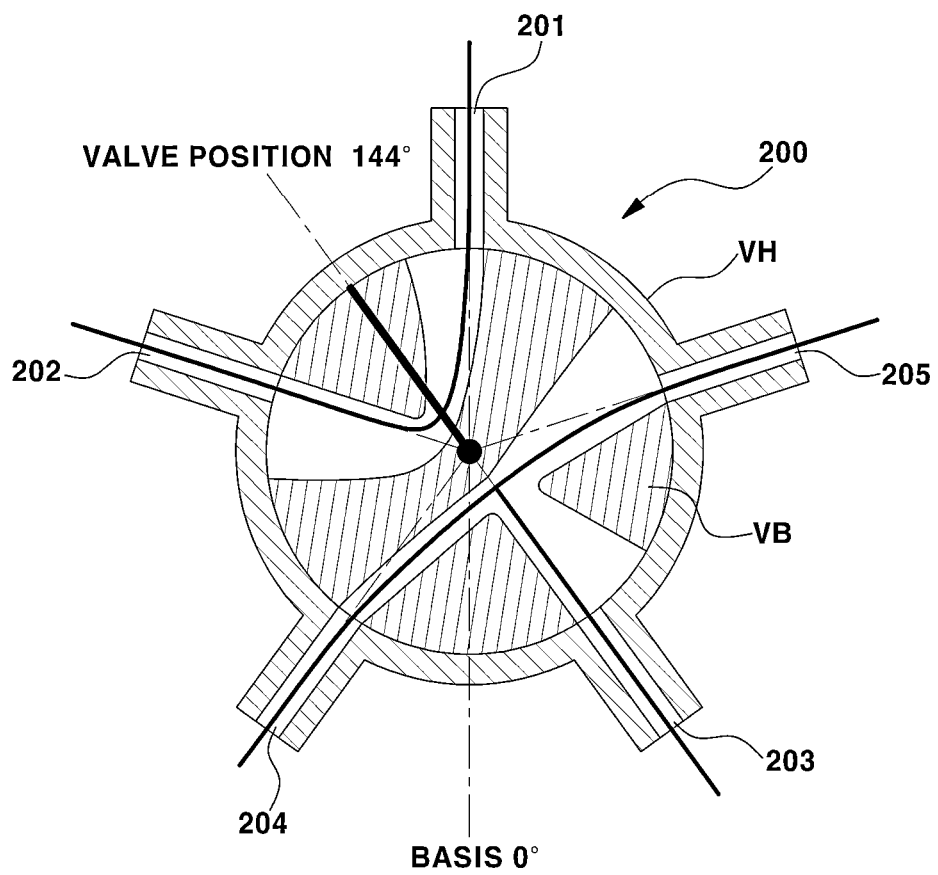
FIG. 13 is a view showing an opening state of the second flow control valve in the high performance mode.

FIG. 11 is a view showing an opening state of the first flow control valve 190 in the battery combination cooling mode of FIG. 3. FIG. 12 is a view showing the opening state of the first flow control valve 190 in the high performance mode of FIG. 8. FIG. 13 is a view showing an opening state of the second flow control valve 200 in the high performance mode of FIG. 8.

As shown in FIGS. 11-13, the valve body VB is rotatably installed in the valve housing VH of each of the first flow control valve 190 and the second flow control valve 200. The valve body VB is rotated by the actuator (not shown) and driving of the actuator is controlled by the controller.

The flow passage VP is formed through the valve body VB. The flow passage VP is located in the valve body VB such that the coolant passes through predetermined ones of the ports of the valve housing VH depending on the rotational position of the valve body VB. The ports communicate with each other via the flow passage VP in the valve body VB, whereby the coolant passes through the flow passage VP in the valve body VB, and therefore the coolant flows through the selected ports. In this way, ports that communicate with each other are changed depending on the rotational position of the valve body VB, whereby the flow direction of the coolant is changed.

Referring to FIG. 12, it can be seen that the rotational position of the valve body of the first flow control valve 190 is controlled such that the first inlet port 191 and the first outlet port 192 communicate with each other and the second inlet port 193 and the third outlet port 195 communicate with each other via the flow passage VP formed through the valve body VB. At this position of the valve body VB, the second outlet port 194 of the first flow control valve 190 is closed by the valve body VB.

In addition, as can be seen from FIG. 12, in the valve body VB of the first flow control valve 190, the flow passage connecting the first inlet port 191 and the first outlet port 192 to each other and the flow passage connecting the second inlet port 193 and the third outlet port 195 to each other are entirely divided from each other.

Referring to FIG. 13, it can be seen that the rotational position of the valve body of the second flow control valve 200 is controlled such that the third inlet port 205 and the second outlet port 204 communicate with each other. It can also be seen that the first inlet port 201 and the first outlet port 202 communicate with each other via the flow passage VP formed through the valve body VB.

At this position of the valve body VB, the second inlet port 203 of the second flow control valve 200 may be in an open state, rather than closed by the valve body VB. However, the second outlet port 194 of the first flow control valve 190 is closed, whereby the coolant is not discharged through the second outlet port 194 of the first flow control valve 190. As a result, no coolant is introduced through the second inlet port 203 of the second flow control valve 200.

Also, even in the valve body VB of the second flow control valve 200, the flow passage connecting the third inlet port 205 and the second outlet port 204 to each other and the flow passage connecting the first inlet port 201 and the first outlet port 202 to each other are entirely divided from each other.

Figure 14:
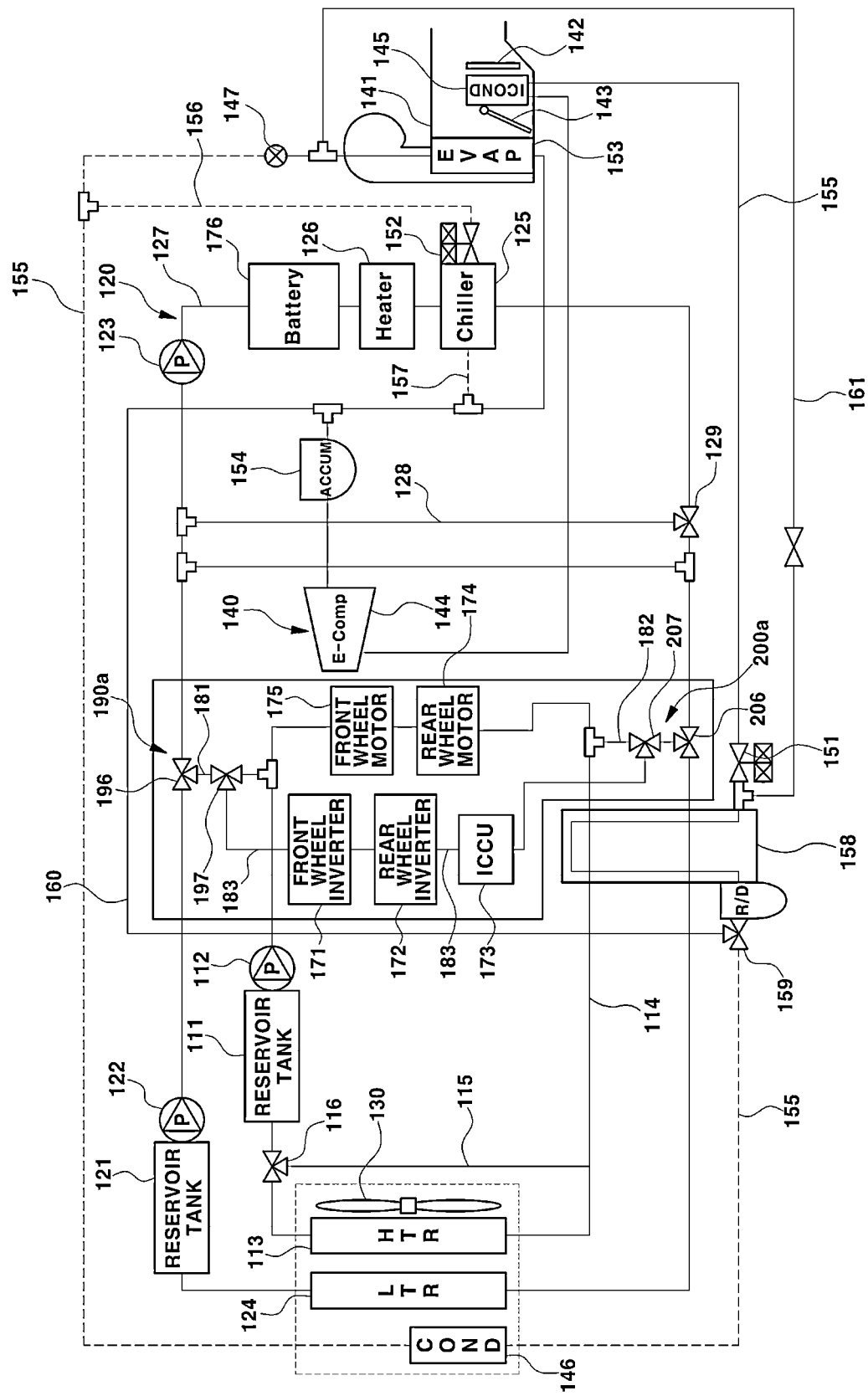
FIG. 14 is a view showing the construction of a thermal management system according to a second embodiment of the present disclosure.

Meanwhile, FIG. 14 is a view showing the construction of a thermal management system according to a second embodiment of the present disclosure. As shown, in the thermal management system according to the second embodiment of the present disclosure, flow control valve sets 190a and 200a, which are flow control devices including a plurality of valves 196, 197, 206, and 207 and connection pipes 181 and 182, instead of the flow control valves. The thermal management system according to the second embodiment is not different in other constructions from the thermal management system according to the first embodiment except that the flow control valve sets are used instead of the flow control valves.

In the second embodiment of the present disclosure, the flow control devices include a first flow control valve set 190a, which is a first flow control device, and a second flow control valve set 200a, which is a second flow control device. In the second embodiment of the present disclosure, installation positions of the first flow control valve set 190a and the second flow control valve set 200a are not different from the installation positions of the first flow control valve 190 and the second flow control valve 200 of the first embodiment. In addition, disposition states of front and rear wheel motors 175 and 174, front and rear wheel inverters 171 and 172, and an integrated charging control unit 173 are not different from those in the first embodiment.

In the thermal management system according to the second embodiment, a first coolant line 114 connected to a first radiator 113, a second coolant line 127 connected to a second radiator 124, and a third coolant line 183 connected thereto in parallel in a diverging form are connected to each other via the flow control valve sets 190a and 200a. Here, the flow control valve sets include two flow control valve sets configured to allow a coolant to flow between the first coolant line 114, the second coolant line 127, and the third coolant line 183, i.e., a first flow control valve set 190a and a second flow control valve set 200a.

The first flow control valve set 190a and the second flow control valve set 200a are constituted by connection lines 181 and 182 that connect the first coolant line 114 and the second coolant line 127 to each other and a plurality of valves 196, 197, 206, and 207. At this time, the first coolant line 114 at the rear end of the first radiator 113 and the second coolant line 127 at the rear end of the second radiator 124 are connected to each other via the first flow control valve set 190a. In the same manner, the first coolant line 114 at the front end of the first radiator 113 and the second coolant line 127 at the front end of the second radiator 124 are connected to each other via the second flow control valve set 200a.

In other words, in the second embodiment of the present disclosure, as shown in FIG. 14, the first flow control valve set 190a is disposed so as to connect the first coolant line 114 at the rear end of a first electric water pump 112 and the second coolant line 127 at the rear end of a second electric water pump 122 to each other. In addition, the second flow control valve set 200a is disposed so as to connect the first coolant line 114 at the front end of a heat exchanger 158 and the second coolant line 127 at the front end of the heat exchanger 158 to each other.

In addition, the third coolant line 183 diverging from the first flow control valve set 190a is connected to the second flow control valve set 200a. The third coolant line 183 is a branch coolant line, in the same manner as in the first embodiment and is connected to the first coolant line 114 between the two flow control valve sets 190a and 200a in parallel. The third coolant line 183 connects the first flow control valve set 190a and the second flow control valve set 200a to each other.

The construction of each of the flow control valve sets is described in more detail. The first flow control valve set 190a includes a first connection line 181 installed so as to connect the first coolant line 114 and the second coolant line 127 to each other and includes a first branch valve 196 installed at the position at which the first connection line 181 diverges from the second coolant line 127. The first branch valve may be a three-way valve. The first flow control valve set 190a also includes a second branch valve 197 installed at the position at which the third coolant line 183 diverges from the first connection line 181. The second branch valve may also be a three-way valve.

In addition, the second flow control valve set 200a includes a second connection line 182 installed so as to connect the first coolant line 114 and the second coolant line 127 to each other and includes a third branch valve 206 installed at the position at which the second connection line 182 diverges from the second coolant line 127. The third branch valve may be a three-way valve. The second flow control valve set 200a also includes a fourth branch valve 207 installed at the position at which the third coolant line 183 diverges from the second connection line 182. The fourth branch valve may also be a three-way valve.

In the two flow control valve sets 190a and 200a, the third coolant line 183 is connected between the second branch valve 197 and the fourth branch valve 207, and the front wheel inverter 171, the rear wheel inverter 172, and an integrated charging control unit (ICCU) 173 are disposed on the third coolant line 183, in the same manner as in the first embodiment. Also, in the two flow control valve sets 190a and 200a, each of the four branch valves 196, 197, 206, and 207 is a three-way valve and is an electronic valve configured to be controlled according to a control signal of a controller.

Also, in the second embodiment of the present disclosure, each of the first flow control valve set 190a and the second flow control valve set 200a performs a function of controlling the flow direction of the coolant in a total of five directions, in the same manner as in each flow control valve (which is a five-way valve) of the first embodiment. In addition, the thermal management system according to the second embodiment of the present disclosure may also be operated in a normal mode and a battery combination cooling mode, in the normal mode and a battery separation cooling mode, and in a high performance (sports) mode as the result of each branch valve being controlled by the controller.

Figure 15:
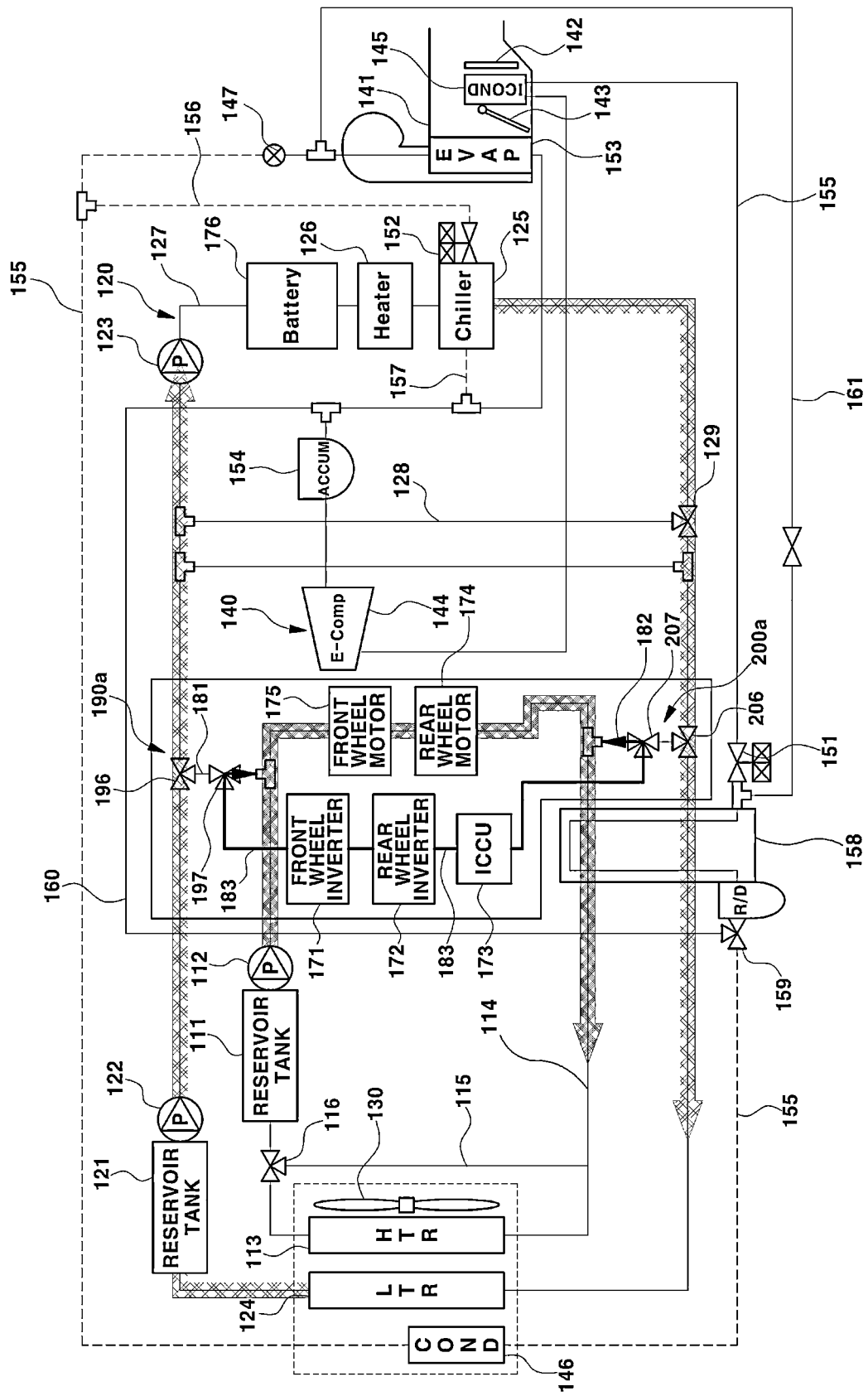
FIGS. 15-17 are views showing operation states of the thermal management system according to the second embodiment of the present disclosure.
Figure 16:
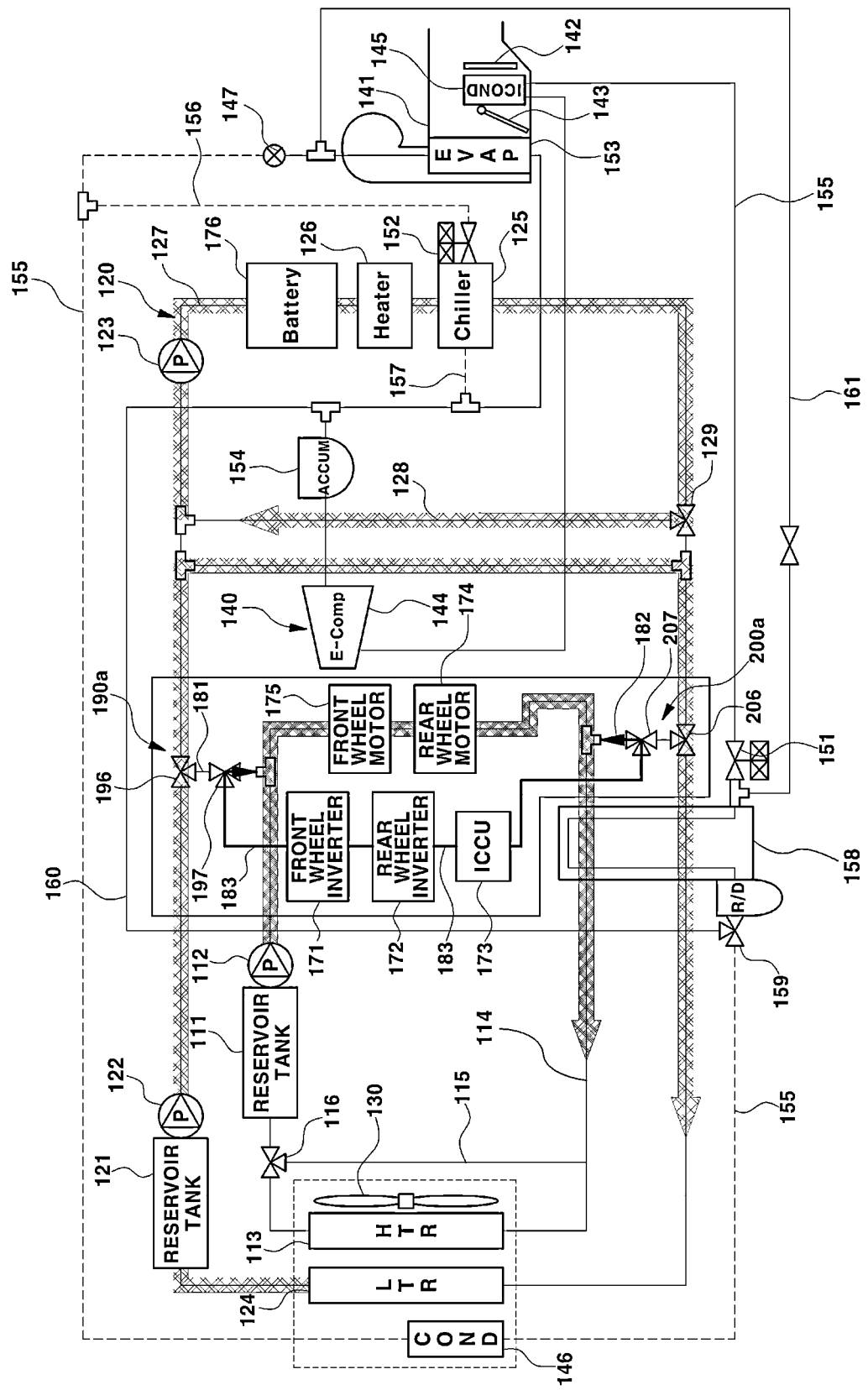
Figure 17:
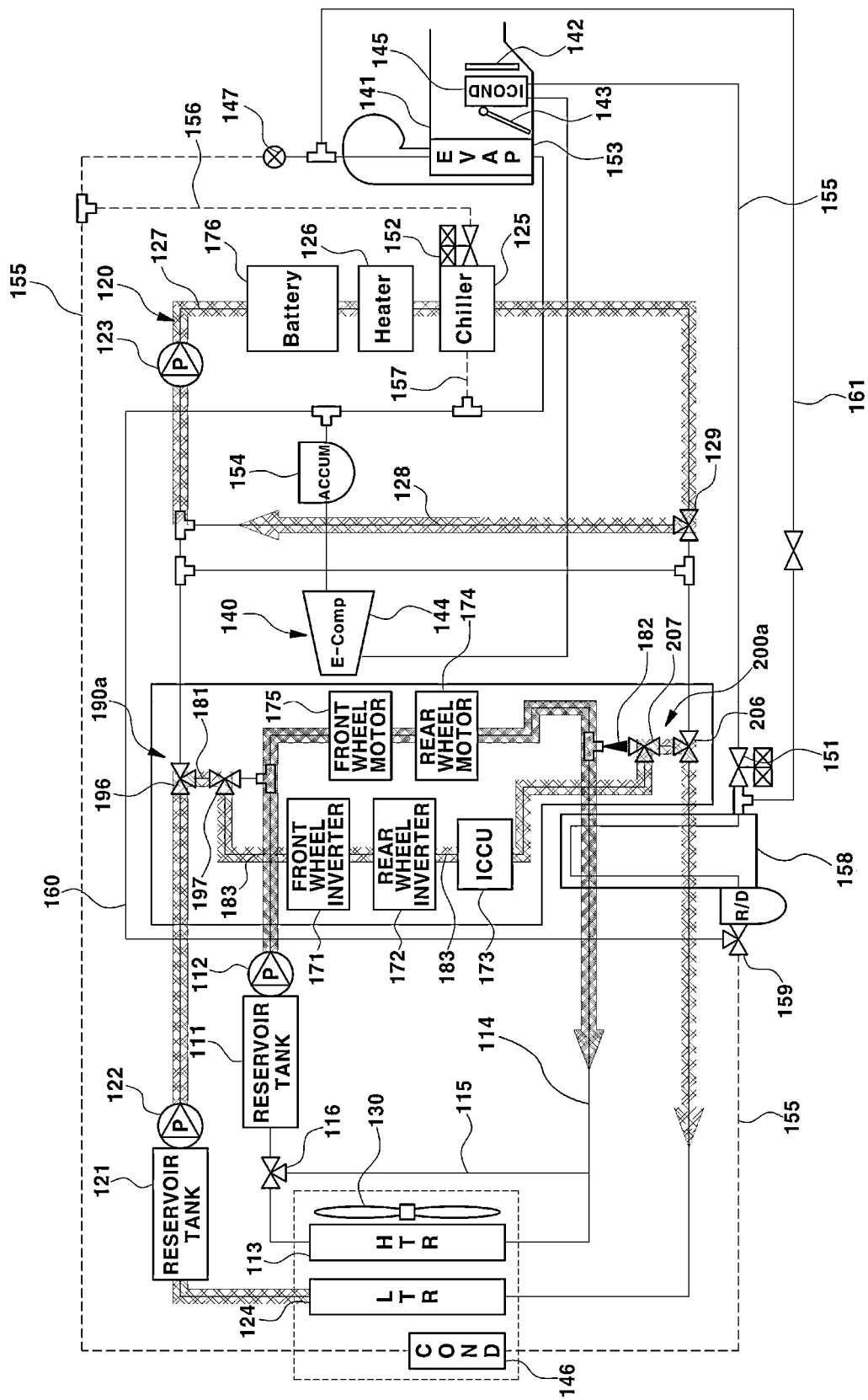

FIGS. 15-17 are views showing operation states of the thermal management system according to the second embodiment of the present disclosure. FIG. 15 shows an operation state in the normal mode and the battery combination cooling mode. FIG. 16 shows an operation state in the normal mode and the battery separation cooling mode. FIG. 17 shows an operation state in the high performance mode.

Basically, referring to FIGS. 15-17, the coolant lines in which the coolant flows, the direction and route in which the coolant flows, and the radiators, which cool the coolant that has cooled power electronic parts and a battery 176 as the result of heat radiation, in each mode of the second embodiment are not different from those in each mode of the first embodiment.

A person having ordinary skill in the art to which the present disclosure pertains (an ordinary skilled person) should fully understand that the direction and route in which the coolant flows in each mode is changed by controlling the first branch valve 196 and the second branch valve 197 of the first flow control valve set 190a and the third branch valve 206 and the fourth branch valve 207 of the second flow control valve set 200a, in the same manner as in the first embodiment.

In addition, on the assumption that the direction and route in which the coolant flows in an operation state for each mode of the second embodiment are identical to those in an operation state for each mode of the first embodiment, an ordinary skilled person should fully understand a control state of each branch valve for each mode with reference to FIGS. 15-17. Therefore, a description of the operation state for each mode of the second embodiment is omitted.

The thermal management system for electric vehicles according to the embodiments of the present disclosure is described in detail above. In the thermal management system according to the present disclosure, it is possible to reduce resistance of each coolant line, whereby it is possible to greatly increase flow rate of the coolant passing through each radiator, compared to the conventional art. In addition, it is possible to improve cooling performance under various vehicle conditions through optimum coolant flow control for each mode.

As should be apparent from the foregoing, the thermal management system for electric vehicles according to the present disclosure has effects and advantages in that it is possible to greatly increase flow rate of the coolant in each coolant line and flow rate of the coolant passing through each radiator, compared to the conventional art. Also, it is possible to improve cooling performance under various vehicle conditions through optimum coolant flow control for each mode.

The effects and advantages of the present disclosure are not limited to those mentioned above. Other unmentioned effects should be clearly understood by an ordinary skilled person from the above description.

It should be apparent to a person of ordinary skill in the art that the present disclosure described above is not limited to the above embodiments and the accompanying drawings. Additionally, it should be apparent that various substitutions, modifications, and variations can be made without departing from the technical idea of the present disclosure.

What is claimed is:

1. A thermal management system for electric vehicles, the thermal management system comprising a water-cooled cooling system configured to cool power electronic parts and a battery, wherein the water-cooled cooling system comprises:
    a first radiator, a first electric water pump, and a first coolant line connected to the first radiator, the first coolant line being configured to allow a coolant to be circulated by the first electric water pump;
    a second radiator, a second electric water pump, and a second coolant line connected to the second radiator, the second coolant line being configured to allow a coolant to be circulated by the second electric water pump; and
    a first flow control device and a second flow control device installed at upstream ends and downstream ends of the first radiator and the second radiator so as to control a coolant flow direction between the first coolant line, the second coolant line, and a third coolant line,
    wherein the third coolant line is installed so as to connect the first flow control device and the second flow control device to each other,
    wherein at least some of the power electronic parts are installed on the first coolant line between the first flow control device and the second flow control device so as to be cooled by the coolant,
    wherein the remainder of the power electronic parts are installed on the third coolant line between the first flow control device and the second flow control device so as to be cooled by the coolant,
    wherein the battery is installed on the second coolant line so as to be cooled by the coolant,
    wherein a bypass line is installed so as to connect a front end and a rear end of the second radiator to each other such that the coolant that has passed through the battery bypasses the second radiator,
    wherein a three-way valve is installed at a position at which the bypass line diverges from the second coolant line,
    wherein a third electric water pump and a battery cooling chiller configured to cool the coolant passing through the battery through heat exchange between the coolant and a refrigerant of an air conditioner are installed on the second coolant line, and
    wherein, in a state in which a flow passage toward the bypass line is opened by the three-way valve, the coolant circulated by the third electric water pump passes through the battery and the chiller while flowing along the second coolant line and then passes through the bypass line.

2. The thermal management system according to claim 1, wherein
    a vehicle driving motor, which is one of the power electronic parts, is installed on the first coolant line between the first flow control device and the second flow control device, and
    an inverter configured to drive and control the vehicle driving motor, which is one of the power electronic parts, is installed on the third coolant line.

3. The thermal management system according to claim 2, wherein
    the vehicle driving motor installed on the first coolant line comprises a front wheel motor configured to drive front wheels and a rear wheel motor configured to drive rear wheels, and
    the inverter installed on the third coolant line comprises a front wheel inverter configured to drive and control the front wheel motor and a rear wheel inverter configured to drive and control the rear wheel motor.

4. The thermal management system according to claim 2, wherein an on-board charger and low voltage DC-DC converter configured to charge the battery is further installed on the third coolant line so as to be cooled by the coolant.

5. The thermal management system according to claim 1, wherein
    each of the first flow control device and the second flow control device is configured to control a flow direction of the coolant according to a control signal output by a controller, and
    the controller outputs a control signal for controlling the flow direction of the coolant such that the coolant that has passed through the first radiator is distributed to the first coolant line and the third coolant line between the two flow control devices so as to flow in parallel.

6. The thermal management system according to claim 5, wherein
    in a case in which a normal mode is selected from among vehicle driving modes by a driver, the controller outputs a control signal for controlling the flow direction of the coolant such that the coolant that has passed through the first radiator is distributed to the first coolant line and the third coolant line between the two flow control devices so as to flow in parallel.

7. The thermal management system according to claim 1, wherein
    each of the first flow control device and the second flow control device is configured to control a flow direction of the coolant according to a control signal output by a controller, and the controller outputs a control signal for controlling the flow direction of the coolant such that the coolant that has passed through one of the two radiators passes through the first coolant line between the two flow control devices and such that the coolant that has passed through the other of the two radiators passes through the third coolant line.

8. The thermal management system according to claim 7, wherein
when a high performance mode is selected from among vehicle driving modes by a driver, the controller outputs a control signal for controlling the flow direction of the coolant such that the coolant that has passed through one of the two radiators passes through the first coolant line between the two flow control devices and such that the coolant that has passed through the other of the two radiators passes through the third coolant line.

9. The thermal management system according to claim 1, wherein
each of the first flow control device and the second flow control device is configured to control a flow direction of the coolant according to a control signal output by a controller, and
when a normal mode is selected from among vehicle driving modes by a driver, the controller outputs a control signal for controlling the flow direction of the coolant such that the coolant that has passed through the first radiator is distributed to the first coolant line and the third coolant line between the two flow control devices so as to flow in parallel and such that the coolant that has passed through the second radiator flows to the second coolant line in which the battery is installed in order to cool the battery.

10. The thermal management system according to claim 1, wherein
when a high performance mode is selected from among vehicle driving modes by a driver, the controller controls the three-way valve to open the flow passage toward the bypass line, drives the third electric water pump such that the coolant is circulated along the second coolant line, in which the battery is installed, and the bypass line, and operates a compressor of the air conditioner such that the refrigerant passes through the chiller in order to cool the battery using the chiller.

11. The thermal management system according to claim 10, wherein
each of the first flow control device and the second flow control device is configured to control a flow direction of the coolant according to a control signal output by a controller, and
when a high performance mode is selected from among vehicle driving modes by a driver, the controller outputs a control signal for controlling the flow direction of the coolant such that the coolant that has passed through one of the two radiators passes through the first coolant line between the two flow control devices and such that the coolant that has passed through the other of the two radiators passes through the third coolant line.

12. The thermal management system according to claim 1, wherein
the first flow control device is a first flow control valve installed between the first coolant line, the second coolant line, and the third coolant line at the rear end of the first radiator and the rear end of the second radiator, and the second flow control device is a second flow control valve installed between the first coolant line, the second coolant line, and the third coolant line at the front end of the first radiator and the front end of the second radiator.

13. The thermal management system according to claim 12, wherein
the first flow control valve is a five-way valve having a first inlet port, a first outlet port, a second inlet port, a second outlet port, and a third outlet port,
the first coolant line connected to an outlet side of the first radiator is connected to the first inlet port of the first flow control valve,
the first coolant line connected to the second flow control valve is connected to the first outlet port of the first flow control valve,
the second coolant line connected to an outlet side of the second radiator is connected to the second inlet port of the first flow control valve,
the second coolant line connected to a coolant path inlet side of the battery is connected to the second outlet port of the first flow control valve, and
the third coolant line connected to the second flow control valve is connected to the third outlet port of the first flow control valve.

14. The thermal management system according to claim 12, wherein
the second flow control valve is a five-way valve having a first inlet port, a first outlet port, a second inlet port, a second outlet port, and a third inlet port,
the first coolant line connected from the first outlet port of the first flow control valve is connected to the first inlet port of the second flow control valve,
the first coolant line connected to an inlet side of the first radiator is connected to the first outlet port of the second flow control valve,
the second coolant line connected to a coolant path outlet side of the battery is connected to the second inlet port of the second flow control valve,
the second coolant line connected to an inlet side of the second radiator is connected to the second outlet port of the second flow control valve, and
the third coolant line connected from the third outlet port of the first flow control valve is connected to the third inlet port of the second flow control valve.

15. The thermal management system according to claim 13, wherein
the first flow control device is a first flow control valve set comprising a connection line configured to connect the first coolant line and the second coolant line at the rear end of the first radiator and the rear end of the second radiator and a plurality of valves, and
the second flow control device is a second flow control valve set comprising a connection line configured to connect the first coolant line and the second coolant line at the front end of the first radiator and the front end of the second radiator and a plurality of valves.

16. The thermal management system according to claim 15, wherein the first flow control valve set comprises:
a first connection line installed so as to connect the first coolant line and the second coolant line to each other;
a first branch valve installed at a position at which the first connection line diverges from the second coolant line, the first branch valve being a three-way valve; and
a second branch valve installed at a position at which the third coolant line diverges from the first connection line, the second branch valve being a three-way valve.

17. The thermal management system according to claim 15, wherein the second flow control valve set comprises:
- a second connection line installed so as to connect the first coolant line and the second coolant line to each other;
- a third branch valve installed at a position at which the second connection line diverges from the second coolant line, the third branch valve being a three-way valve; and
- a fourth branch valve installed at a position at which the third coolant line diverges from the second connection line, the fourth branch valve being a three-way valve.

* * * * *